(12) United States Patent
Gharib et al.

(10) Patent No.: US 10,545,928 B2
(45) Date of Patent: Jan. 28, 2020

(54) TEXTUAL ANALYSIS SYSTEM FOR AUTOMATIC CONTENT EXTACTION

(75) Inventors: Hamid Gharib, London (GB); Simon Thompson, London (GB); Duong Nguyen, London (GB); Marcus Thint, Jacksonville, FL (US)

(73) Assignee: BRITISH TELECOMMUNICATIONS public limited company, London (GB)

( * ) Notice: Subject to any disclaimer, the term of this patent is extended or adjusted under 35 U.S.C. 154(b) by 861 days.

(21) Appl. No.: 14/009,027

(22) PCT Filed: Mar. 29, 2012

(86) PCT No.: PCT/GB2012/000296
§ 371 (c)(1),
(2), (4) Date: Sep. 30, 2013

(87) PCT Pub. No.: WO2012/131310
PCT Pub. Date: Oct. 4, 2012

(65) Prior Publication Data
US 2014/0025698 A1   Jan. 23, 2014

(30) Foreign Application Priority Data
Mar. 30, 2011   (EP) .................................. 11250404

(51) Int. Cl.
*G06F 16/21* (2019.01)
*G06F 17/27* (2006.01)
*G06F 17/22* (2006.01)

(52) U.S. Cl.
CPC ........ *G06F 16/211* (2019.01); *G06F 17/2745* (2013.01); *G06F 17/2247* (2013.01); *G06F 17/2715* (2013.01)

(58) Field of Classification Search
CPC ........... G06F 17/30292; G06F 17/2715; G06F 17/2745; G06F 17/2247; G06F 16/211
See application file for complete search history.

(56) References Cited

U.S. PATENT DOCUMENTS 6,604,099 B1   8/2003   Chung et al.
7,165,216 B2 *  1/2007   Chidlovskii ...... G06F 17/30914
                                              707/999.1

(Continued)

OTHER PUBLICATIONS

Sangeetha Kutty et al,, "Combining the structure and content of XML documents for Clustering using frequent subtrees", Faculty of Science and Technology, Queensland University of Technology, Brisbane, Australia, INEX 2008 Workshop Pre-proceedings, Dec. 15-18, 2008 (12 pgs.).

(Continued)

*Primary Examiner* — Pierre M Vital
*Assistant Examiner* — Andalib F Lodhi
(74) *Attorney, Agent, or Firm* — Nixon & Vanderhye P.C.

(57) ABSTRACT

The present invention provides a method, and an associated apparatus configured to implement such a method, for analysing mark-up language text content, such as might be found on a website or within online user generated content. The method comprises a training phase, in which plurality of schemas are automatically generated from a specified text and a final schema is compiled. This final schema can then be used to compare with other online text content such that content which matched the final schema can be identified, for example for further analysis and comparison.

14 Claims, 6 Drawing Sheets

(56) References Cited

U.S. PATENT DOCUMENTS

| | | | |
|---|---|---|---|
| 7,574,530 B2* | 8/2009 | Wang | G06F 17/3087 709/217 |
| 8,239,425 B1* | 8/2012 | Bell | G06F 17/30864 706/12 |
| 2002/0052894 A1* | 5/2002 | Bourdoncle | G06F 16/954 715/202 |
| 2003/0046078 A1* | 3/2003 | Abrego | G10L 15/197 704/260 |
| 2003/0101166 A1 | 5/2003 | Uchino et al. | |
| 2004/0177015 A1 | 9/2004 | Galai et al. | |
| 2005/0022115 A1 | 1/2005 | Baumgartner et al. | |
| 2006/0143175 A1* | 6/2006 | Ukrainczyk | G06F 17/218 |
| 2007/0050708 A1* | 3/2007 | Gupta | G06F 17/30908 715/235 |
| 2008/0059147 A1* | 3/2008 | Afify | G06Q 30/02 704/5 |
| 2008/0091751 A1* | 4/2008 | Vendelin | G06F 16/51 |
| 2010/0138415 A1* | 6/2010 | Lein | G06F 17/2211 707/736 |
| 2010/0175011 A1 | 7/2010 | Song et al. | |
| 2010/0241639 A1* | 9/2010 | Kifer | G06F 17/30719 707/754 |

OTHER PUBLICATIONS

Richi Nayak et al., "Report on the XML Mining Track's Clustering Task at INEX" 2009, Faculty of Science and Technology, Queensland University of Technology, Brisbane, Australia, INEX 2009 Workshop Pre-proceedings, Dec. 6-10, 2009 (8 pgs.).

International Search Report for PCT/GB2012/000296, dated May 23, 2012.

Nayak, R. et al., "Report on the XML mining track's clustering task at INEX 2009" Internet Citation, (Dec. 6, 2009), pp. 343-348.

Kutty, S. et al, "Combining the structure and content of XML documents for clustering using frequent subtrees", Internet Citation, (Dec. 15, 2008), pp. 391-401.

\* cited by examiner

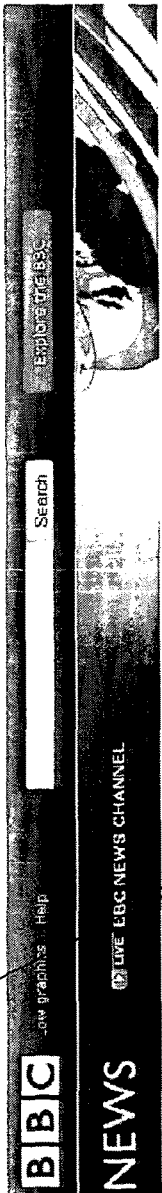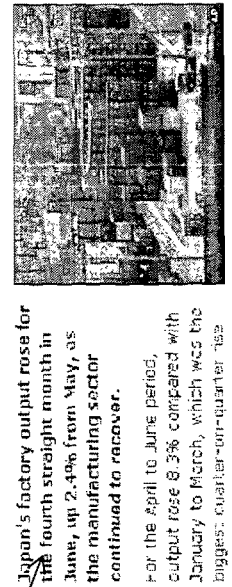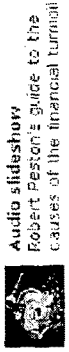
Figure 1

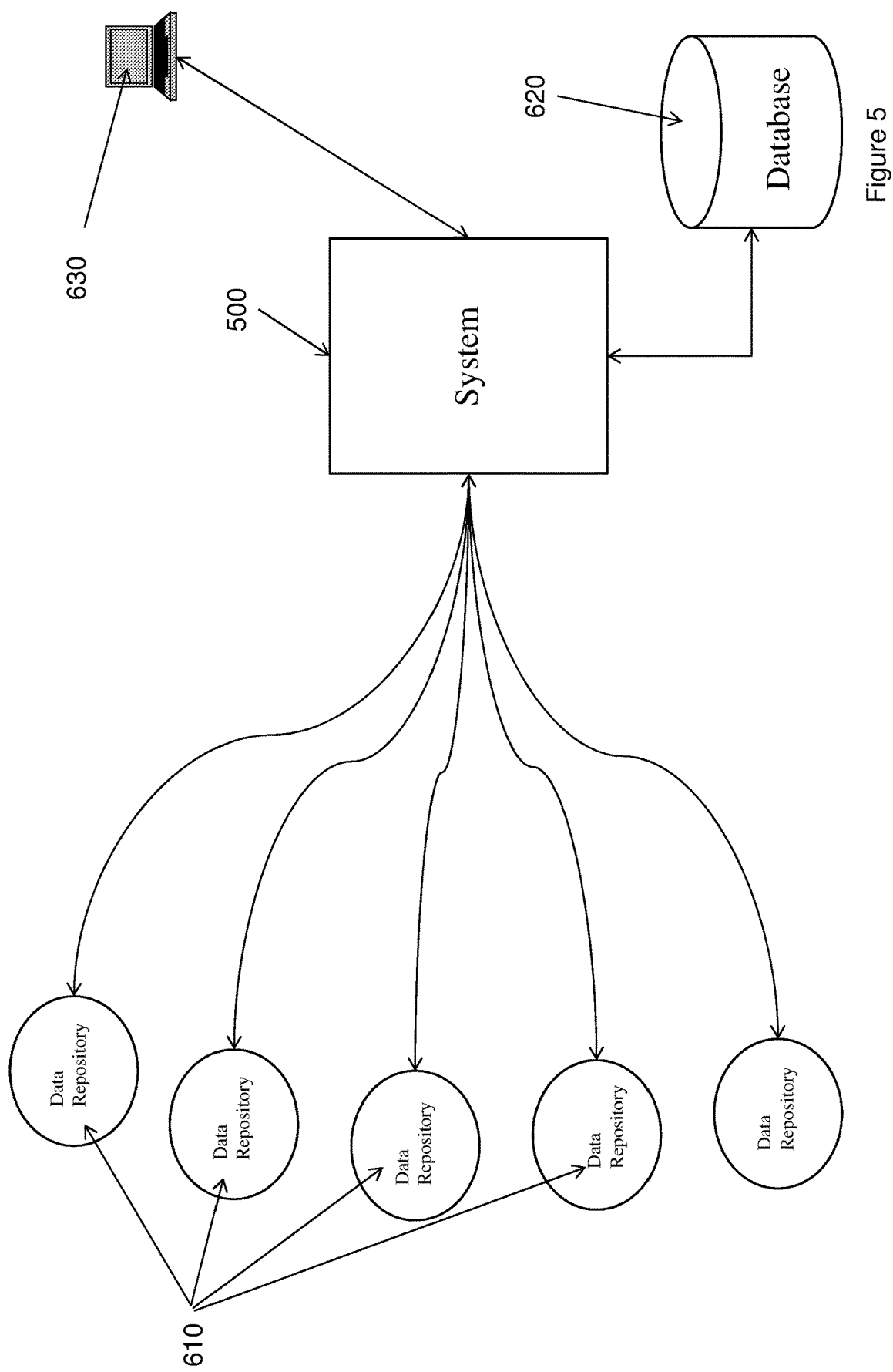

TEXTUAL ANALYSIS SYSTEM FOR AUTOMATIC CONTENT EXTACTION

This application is the U.S. national phase of International Application No. PCT/GB2012/000296, filed 29 Mar. 2012, which designated the U.S. and claims priority to EP Application No. 11250404.8 filed 30 Mar. 2011, the entire contents of each of which are hereby incorporated by reference.

BACKGROUND AND SUMMARY

The present invention provides a system for analysing online text repositories and in particular a system that can analyse online text and automatically extract text sequences that may be of interest to a party, in accordance with predetermined criteria.

Social networking sites and other web 2.0 services allow users to create comments or content regarding the goods and services that they have used and for other users to then add further comments. For example, groups on Facebook or Twitter trends can quickly be established which may make unfavourable comments regarding a business's activities or products, leading to subsequent brand damage for the business concerned. Given the large number of social networking sites, blogs, message boards, etc. it is not a practical proposition for a business or enterprise to monitor all of the comments, messages, user generated content, etc., that is generated in order to be able to respond to untrue or unfavourable information.

A known system for monitoring social networks is provided by Radian6 (see http://www.radian6.com). The system extracts relevant posts from social networks, and other sources of user comments, which can be categorised, prioritised and then assigned to an agent for subsequent processing. The classification of a post as being relevant is based solely on a set of keywords.

Another system is provided by Dapper (see http://www.dapper.net), which has the capability to extract the contents of web pages. Dapper requires the user to select a number of sample web pages all residing on the same level of the hierarchy of a hierarchically organised web site. In the case of each page the user identifies those parts of the page contents that are of interest to him. Dapper is then able to extract those contents from other pages residing at the same level of the hierarchy as the selected sample web pages. Dapper is not able to traverse the hierarchy of a web site and to then extract content from multiple levels of the hierarchy.

According to a first aspect of the present invention there is provided a method of automatically extracting content from a data resource, the data resource comprising a plurality of hierarchical levels, each of the plurality of hierarchical levels comprising content defined using mark-up language and the method comprising a training phase and a content extraction phase, wherein the training phase precedes the content extraction phase; the training phase comprising the steps of: i) defining one or more hierarchical levels of interest; ii) defining an entity which is comprised within the or each hierarchical levels of interest defined in step i) and one or more properties associated with that entity; and for each of the entities and the associated entity properties defined in step ii), executing a plurality of training instances, wherein each of the training instances comprises the steps of: a) defining a value for each of the one or more properties associated with said entity; b) for each of the property values, determining the containing element which provides a match to the property value and storing the containing element in an instance schema, the instance schema being associated with said entity; and iii) comparing each of the plurality of instance schemas associated with said entity to generate a final schema for said entity; the content extraction phase comprising the steps of: I) comparing a data resource from which content is to be extracted with the composite schema; II) identifying those entities and their associated properties within the data resource which match the containing elements specified in the composite schema; and III) extracting those entities and their associated properties identified in step II) from the data resource. The training phase may comprise the further step of: iv) storing the one or more final schemas in a composite schema which is associated with the data resource.

In step iii) the first instance schema to be generated for an entity may be retained and have assigned an occurrence count value of 1. Alternatively, if there is no adequate match between a first instance schema and a second instance schema then the second instance schema will be retained and is assigned an occurrence count value of 1. In a yet further alternative, if a first instance schema is identical to a second instance schema then the occurrence count of the first instance schema will be incremented and the second instance schema will be discarded.

A derived instance schema may be created by merging a first instance schema with a second instance schema. The derived instance schema may be created by merging a first instance schema with a second instance schema if there is an adequate degree of similarity between the first and second schemas. Such a derived instance schema may be created by merging a first instance schema with a second instance schema if the first and second instance schema comprise: a) a common start-tag; b) identical sub-element hierarchies; and c) an equal number of property elements comprised within the sub-element hierarchies. The first derived instance schema to be generated for an entity may be retained and have assigned an occurrence count value of 1. If a first derived instance schema is identical to a second derived instance schema then the occurrence count of the first derived instance schema will be incremented and the second derived instance schema will be discarded.

Step iii) may comprise the step of determining which of the plurality of instance schemas and derived instance schemas has an occurrence frequency which exceeds a predetermined threshold value. The predetermined threshold value may be 60%. Three or more training instances may be executed for each of the entities.

According to a second aspect of the present invention there is provided a data carrier for use in a computing device, the data carrier comprising computer executable code which, in use, performs a method as described above.

According to a third aspect of the present invention there is provided a apparatus comprising one or more central processing units, one or more data storage means and a network interface, the apparatus, in use, being configured to perform a method as described above.

BRIEF DESCRIPTION OF THE DRAWINGS

Embodiments of the present invention will now be described, by way of example only, with reference to the accompanying drawings in which:

FIG. 1 shows a pictorial example of a typical web page, which comprises a number of different textual and graphical elements;

FIG. 2 shows a further pictorial example of a web page;

FIG. 4 shows an example of different graphical user interfaces that may be used with the present invention;

FIG. 5 shows a schematic depiction of a communications network comprising a system according to the present invention.

DETAILED DESCRIPTION OF PRESENT EXAMPLE EMBODIMENTS

Figure 3:
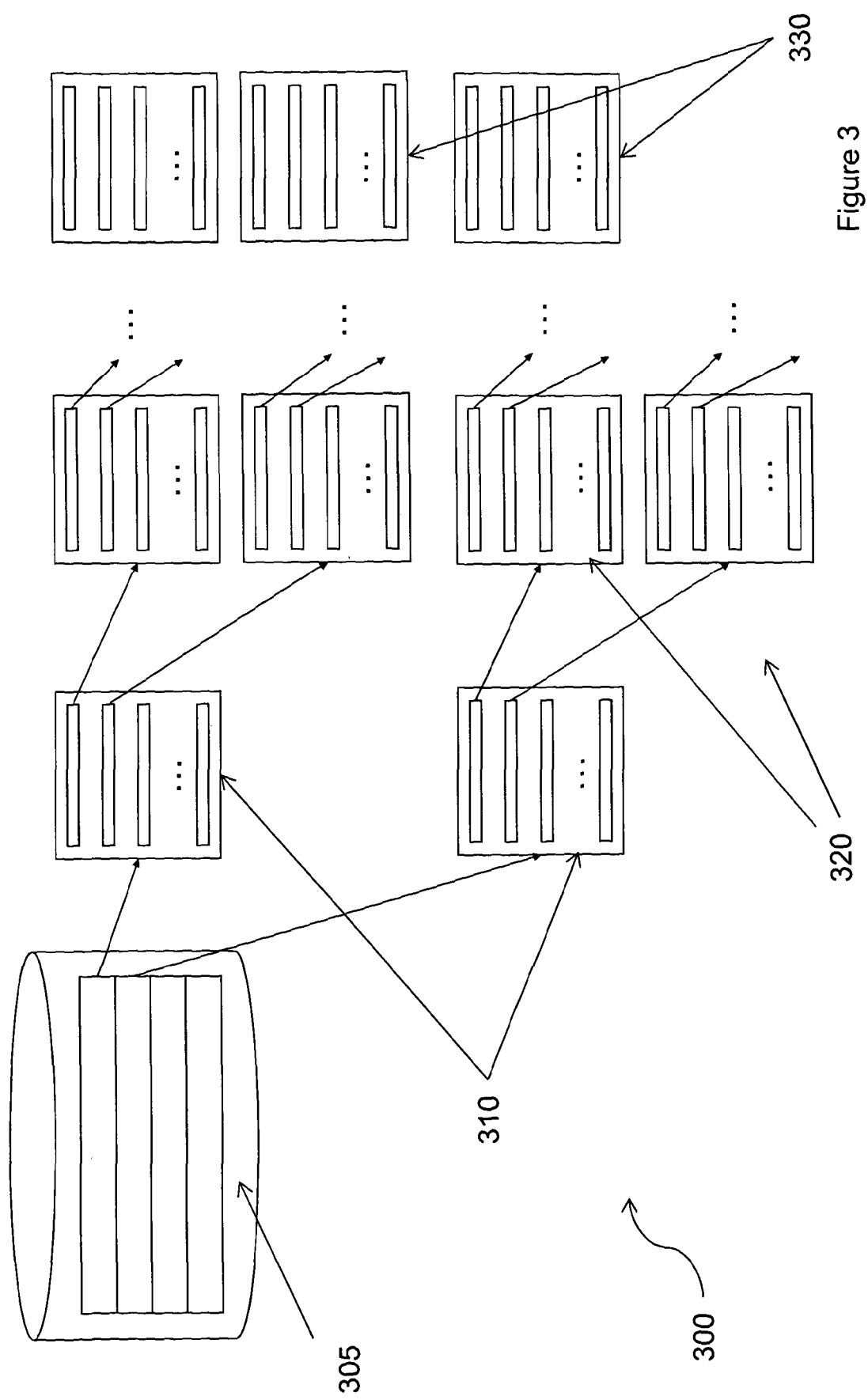
FIG. 3 shows a pictorial representation of a generic entity hierarchy having N levels.

In the following discussion, the term 'web site' will be used to refer to a data source comprising hierarchically-organised, semi-structured data. The term 'web page' will be referred to a marked-up page that contains a subset of the semi-structured data held in a web site. The present invention is designed to operate with either HTML (hyper text mark-up language) or a mark-up language based on XML (eXtensible mark-up language) but it will be understood that it could be used in conjunction with any other mark-up language.

FIG. 1 shows a pictorial example of a typical web page 100, which comprises a number of different textual and graphical elements. For example, the textual content comprises the date and title of the page 110, a summary paragraph 120, the main text body of the story 130, a key stories section 140, a subject based index of the website 150, etc. With regard to the web page shown in FIG. 1, the target contents, that is, the content that is of interest to a particular user, may be the main text of the story 130.

Figure 2:
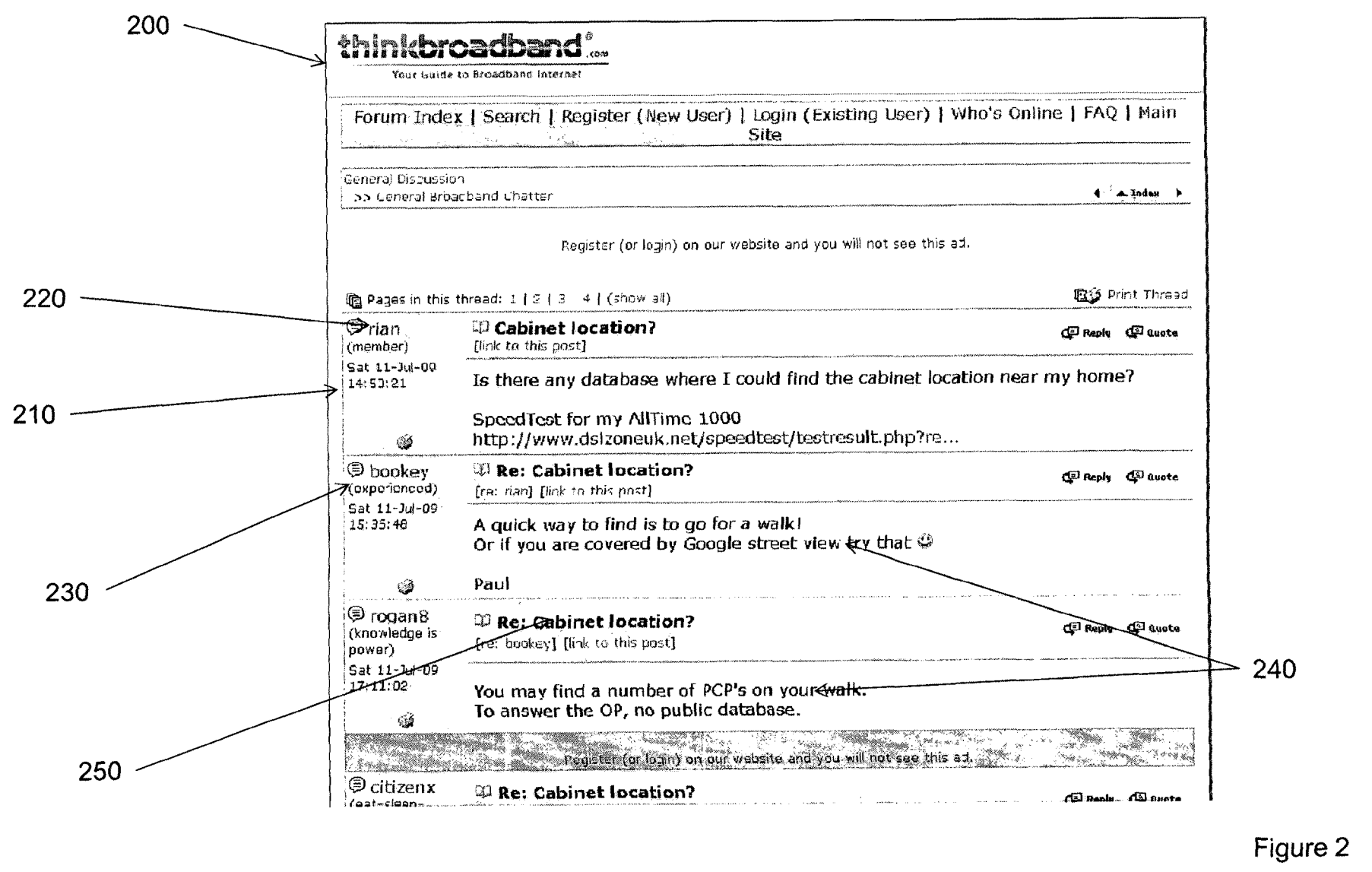

FIG. 2 shows a further pictorial example of a web page 200, in this case an online discussion forum. The online forum comprises, for example, data relating to the time and date of each post generated within the forum 210, the name of the user which generated each post 220, data relating to each of the users 230 (for example a URL associated with each user or a level of membership for each user), the contents of each post 240 and a URL associated with each of the posts 250. It will be understood that a single post element in the web page might constitute more than one of the above features—for example, as shown in FIG. 2, it constitutes the author's name, level of membership and URL. The target contents held within such a discussion forum may comprise the date and time of each post in order to, for example, compute statistical information about the frequency of the posts, or the content of one or more posts.

Typically, the contents of web sites are organised in a hierarchical manner, with individual items (such as posts within a thread of a discussion forum) forming the lowest level of the hierarchy (which can be expressed as being level N in an N level hierarchy). These individual items can be logically classified into separate groups according to the similarity between their properties, for example posts can be grouped within threads and news items from a web site can be grouped together as being related to a particular topic, for example business or politics. These groupings can be considered to form level N−1 of the hierarchy. It can be seen that this grouping of items can be repeated an arbitrary number of times according to the requirements of the web site and the type of data it holds. The groups at each level of the hierarchy can be represented by instances of an entity which is appropriate for that hierarchical level. For instance, in the case of a web site used for maintaining user discussions on one or more topics, the groups at level N−1 may be represented by instances of the thread entity, where a thread consists of a number of posts related to a particular topic.

Similarly, a collection of similar threads can be represented at level N−2 by the forum entity.

It is possible to apply such a process in order to generate an entity hierarchy which describes all of the different levels in a web site. FIG. 3 shows a pictorial representation of a generic entity hierarchy having N levels. The entity hierarchy 300 comprises a database 305 which holds the URLs for the root page of a plurality of web sites. These URLs route to the level 1 entities 310, for each of the plurality of web sites. In turn, each of the level 1 entities are linked to a plurality of level 2 entities 320, and so on down to the level N entities at the lowest level of the entity hierarchy 330. It will be understood that the hierarchical levels 3 to N−1 are not shown in FIG. 3 and that not all of the entities from all of the hierarchical levels are shown.

The entity hierarchy can be useful for navigating through the website and facilitates the process of finding the required posts/documents/news-items by the user when the web site contains a relatively large number of entity instances. The entity instances at each level of the hierarchy are normally contained within one or more web pages. Among the information provided by each entity instance is the address of the web page, in the next level down in the hierarchy, containing the list of its sub-entity instances. Thus, by accessing the web page at the root of the hierarchy, one can traverse all the branches in the hierarchy and extract any entity at any level of the hierarchy.

it is common to find web sites which comprise an entity hierarchy having three levels. For example, an instantiation of the entity-hierarchy consisting of three levels is used by many web sites to host user discussion forums concerned with multiple discussion topics. The top level consists of a list of forums. Each forum comprises a list of discussion threads, and each thread in turn includes a list of posts. This three-level hierarchy will be used as an example of the hierarchically-organised contents on a web site in following discussion.

Each page within a web site will comprise a set of elements described by a mark-up language—for example HTML, XML or a mark-up language based on XML. These mark-up elements enclose the textual contents of each of the pages. Each mark-up element may be embedded within another mark-up element, resulting in one or more element hierarchies. Thus, each mark-up element may have zero or one parent element and zero or more child elements (it will be understood that the root element has zero parent elements). Typically, each element will have the following components:

A start-tag and optionally an end-tag

Some optional contents that appear after the start-tag and before the end-tag (if present).

The start-tag will comprise two parts: a tag-name which provides a user-understandable description of the element's purpose or contents and one or more attributes, each with its own value, in the form of attribute-name=attribute-value. These provide additional information about the purpose or contents of an element. Furthermore, the contents of each element will also be part of the contents of its parent element.

Examples of these properties are shown in the example element-hierarchy given below:

```
<body>
  This is the contents of the body element.
  <table class="storycontent" cellpadding="0" cellspacing="0">
```

```
    This is the contents of both the body and the first table elements.
    <tr>
       <td class="storybody">
       </td>
    </tr>
    </table>
    <table class="storysummary" cellpadding="0" cellspacing="0">
    This is the contents of both the body and the second table elements.
    <tr>
       <td class="storysummarybody">
       </td>
    </tr>
    </table>
</body>
```

The following can be observed from the above example element-hierarchy:

The elements are nested within each other forming a single element-hierarchy comprising seven elements, namely, body, table, tr, td, table, tr and td. The element at the root of the hierarchy (body) has two children which are instances of the table element. Each non-root element has a single parent and zero or more child-elements. For example, each instance of table element has body as its parent and tr as its child.

The contents of the body element is formed by concatenating its own contents and the contents of its two child table elements, i.e.

"This is the contents of the body element. This is the contents of both the body and the first table elements. This is the contents of both the body and the second table elements."

Multiple instances of the same element may be used within the element hierarchy. For example, two instances of each of the table, tr and td elements have been used in the above hierarchy. Each instance can be identified through an implicit instance number identifying it among all instances of that element.

The properties of the first instance of the table element are:

Its parent is an instance of the body element.
Its immediate child is an instance of the tr element.
Its start-tag is: <table class="storycontent" cellpadding="0" cellspacing="0">
Its end-tag is: </table>
Its contents are: "This is the contents of both the body and the first table elements."
Its tag-name (within the start-tag) is: table.
Its attributes and their values (within the start-tag) are:
Attribute name: class
Attribute value: storycontent
Attribute name: cellpadding
Attribute value: 0
Attribute name: cellspacing
Attribute value: 0

Two web pages can be considered to be equivalent with respect to their element-hierarchies if:

(i) they share the same hierarchy, and
(ii) the only difference between their respective hierarchies is that the corresponding instances of each element of the hierarchy in the two pages may have different contents and/or different values for their attributes.

It should be noted that the designer of a web site has total control over the type of mark-up elements that are selected to mark-up each type of data (e.g. date, author, etc.) in the pages that comprise a web site. As discussed previously, an application or user is normally only interested in a specific subset of the contents of a web page, which will hereafter be referred to as the target contents. The target contents are either:

(i) the whole, or a subset, of the contents of a specific element in the web page's element-hierarchy, or
(ii) derived from the values of one or more attributes of an element in the hierarchy.

An example of each case is given below.

In the web page shown in FIG. 1, the date is specified as a subset of the contents of an instance of the div element as follows:

```
<div class="ds">
   <span class="lu">
      Page last updated at
   </span>
      05:42 GMT, Thursday, 30 July 2009 06:42 UK
</div>
```

The div element is referred to as the containing element. Once the containing element is identified, in this case the element with start-tag <div class="ds">, the text representing the date can be extracted from all pages with a similar structure to that of the example page.

In the forum page shown in FIG. 2 each post has its own URL through which the post can be accessed directly. For instance, the URL of the first post may be:
http://forums.thinkbroadband.com/general/t/3664968-cabinet-location.html In this case, the URL is the value of the href attribute of the following element in the element-hierarchy of the page:

```
<a href="http://forums.thinkbroadband.com/general/t/3664968-
   cabinet-location.html">link to this post</a>
```

In the general case, the start-tag of the containing element of each post's URL is <a href="SomeAttributeValue"> where SomeAttributeValue would have a different value in the case of each post.

The target contents can be derived from an attribute value in one of the following ways:

the target contents are identical to the attribute's value
the target contents are included (as a sub-string) within the attribute's value. This calls for the ability to identify the irrelevant parts of the attribute value.
the attribute's value is included (as a sub-string) within the target contents. This calls for the ability to add the missing parts of the target contents as literal strings to the attribute value.
they share one/more sub-strings, e.g. the target contents could be "This is the target day" and the attribute's value could be "That was the target month", and the shared sub-string is "the target". This calls for the ability to identify both the irrelevant parts and the missing parts of the attribute value.

As will be described below in more detail, instances of the target contents can be automatically extracted from the marked-up pages of a web site. This method involves a training phase in which a contents extraction schema (CES) is defined by identifying the relevant mark-up elements that contain the target contents. This is followed by a contents extraction phase in which the target contents are extracted from the web pages of a hierarchically-organised web site using the CES generated in the training phase. The aim of the training phase is to identify the relevant containing elements that contain each instance of the target contents within the web pages of a web site or other data source. The training phase comprises two steps.

In the first step of the training phase, the entity hierarchy of the web site is defined by naming or defining each level of the hierarchy entity that is of interest. This includes naming the entity type that resides at each level of the hierarchy. Also, for the entity type at level N of the hierarchy (e.g. the forum entity) the name of the property (e.g. URL) that provides the link to the entities at level N+1 (e.g. threads) is also specified. It is not required to specify the value of linking property in this training step. This value will be automatically obtained, during the contents extraction phase, from the web page (data source) containing the level N entities. A filter can also be specified for the value of the linking property. This allows only specific values of the linking property to be selected, during the contents extraction phase. Thus, for example, for a forum the threads that are of interest can be identified during the contents extraction phase. Similarly, within those threads, posts that are of interest can be identified.

The second step of the training phase consists of performing multiple training episodes for each type of entity defined in the entity hierarchy. During a training episode for an entity, for example a forum, thread, post, etc., an example of the value of each property, for example the id, title, URL, etc. of that entity is defined. The example values can be obtained from a single web page whose address is provided a system which incorporates the present invention.

For each example property value, the system scans the web page contents to identify the lowest level mark-up element, in the element-hierarchy of the page, which has one of the following relations with the example value:
  i) the example value is the same as, is a subset of, or is a superset of, the element's contents,
  ii) the example value is the same as, is a subset of, or is a superset of the values of one or more attributes of the element
  iii) the example value shares one or more sub-strings with the element's contents or the values of one or more attributes of the element, i.e. the example value is not a subset or superset of the element's contents or its attributes' values.

The lowest-level mark-up element identified above is called the containing element for that property value of the entity. The containing elements for all property values of an entity are packaged into an episode entity Contents Extraction Schema (CES) for that entity. The episode entity CESs obtained in successive training episodes can be compared and a final entity CES for that entity determined. The final entity CES of a number of entities in the entity-hierarchy of the web site are combined into a source CES. A unique name can be assigned to the final source CES which can be stored in a database for subsequent use.

During a training episode, a system according to the present invention (see the description given below with respect to Figure X) attempts to find the lowest level mark-up element within the element-hierarchy of a specified web page from which an example property value can be derived. The choice of the lowest level element stems from the fact that the contents of each mark-up element are part of the contents of its parent element. This applies to all elements along an element-hierarchy.

For example, if the path from an element E to the element at the root of the hierarchy, R, consists of the elements EP [element parent], EPP [element parent's parent] and R (i.e. R→EPP→EP→E), then E's contents are part of EP's contents, which in turn are part of EPP's contents, which in turn are part of R's contents. So in principle, any of these four elements can be selected as the containing element if the example property value matches the contents of E. However, the contents of each element above E in the hierarchy, that is EP, EPP and R, consist of three parts:

(i) E's contents
  (ii) the contents of their descendents other than E (i.e. direct/indirect children), and
  (iii) their own specific contents.

Choosing the lowest level containing element (in this case E) will reduce the possibility of extracting irrelevant information during the contents extraction phase.

During a training episode, the system will search a specified web page to find the lowest-level containing element from which an example property value can be derived. The containing element should be uniquely identifiable within the specified web page so that it can be subsequently located unambiguously within other pages of the associated web site. Unique identification is important because the same mark-up element may be used multiple times within a web page to enclose different types of information. These elements would be indistinguishable from each other because they have identical start-tags and identical end-tags. To overcome this problem, a system according to the present invention will check whether there are multiple instances of the containing element within the example web page. If so, the following three schemes would be used to more precisely specify the identity of the containing element.

When a specified web page contains multiple instances of the containing element, the system would determine the element's instance number among all instances of that element within that page. For instance, the system may determine that the containing element is "table" with start-tag:

<table class="storysummary" cellpadding="0" cellspacing="0">.

Assuming that the specified web page comprises six instances of this element (all with identical start-tags) and that the fourth instance is the relevant instance then this instance number would be recorded along with the start-tag of the containing element to uniquely identify the element. The start-tag and instance number will be stored as the value of the startTag and startTagInstanceNumbers attributes of the Property element (described in detail later), respectively, within an entity CES by the system. For instance, in the case of the above example, the values of these two attributes will be specified as:

```
<Property name="SomeName"
        startTag="<table class="storysummary"
    cellpadding="0" cellspacing="0">"
        startTagInstanceNumbers="4">
```

The name attribute is used to name the property.

It is possible that multiple instances of a containing element may exist in different branches of the element-hierarchy of a web page. For instance, there may be six instances of the table element with identical start-tags (e.g. six instances of the table element from the example in previous section) in three different branches of the hierarchy as follows:

```
<html> → <div> → <table>
<html> → <tr> → <td> → <table>
<html> → <tbody> → <tr> → <td> → <table>
```

Given the further constraints that:
(i) the web page contains four instances of the first branch (<html>→><div>→<table>) and one instance of each of the other two branches, i.e. six instances in total,
(ii) the target containing element is the third instance of the first branch.
(iii) the order in which these six branch instances appear in different web pages of the web site may not always be the same.

For example, in some web pages, the only instance of the second branch (<html>→<tr>→<td>→<table>) may appear before all instances of the first branch:

```
<html > → <tr> → <td> → <table>
<html > → <div> → <table>
<html > → <div> → <table>
<html > → <div> → <table> <!-- target instance -->
<html > → <div> → <table>
<html > → <tbody> → <tr> → <td> → <table>
```

In this case the instance number of the containing element (considering all six instances) would be 4. In some other example web pages, the only instance of the second branch may appear after the third instance of the first branch:

```
<html> → <div> → <table>
<html> → <div> → <table>
<html> → <div> → <table> <!-- target instance -->
<html> → <tr> → <td> → <table>
<html> → <div> → <table>
<html> → <tbody> → <tr> → <td> → <table>
```

In this case the instance number of the containing element would be 3. Clearly, the differences between the element-hierarchies of the example pages would cause the instance number of the containing element to vary and be dependent on the specific example page under consideration. To avoid such variances, the identification of the containing element will, in addition to the element's instance number, also include the list of one or more of its ancestor elements, i.e. its parent element, the parent of parent element, and so on, up to the root of the hierarchy in which it resides. The ancestor list could be specified through the optional AncestorList element which provides the sequence of ancestor elements of the containing element.

```
<AncestorList>
    <Ancestor level="Position in ancestor hierarchy" startTag="Start-tag of an ancestor" />
    <Ancestor level="Position in ancestor hierarchy" startTag="Start-tag of another ancestor" />
    ...
</AncestorList>
```

Each ancestor is represented by its start-tag which will be specified as the value of the startTag attribute of an instance of the Ancestor element. The position of an ancestor in the ancestor-hierarchy is specified by the value of the level attribute. The value 1 indicates parent, 2 indicates grand-parent (that is, a parent of parent), and so on. All instances of the Ancestor element will be enclosed by an instance of the AncestorList element.

The instance number together with the ancestor-hierarchy can uniquely identify a containing element within the element-hierarchy of a web page. Another distinguishing feature of a containing element could be the sub-element-hierarchy that it may contain. This consists of its immediate children, the grandchildren (that is, the children of the immediate children), and so on to any depth. A single branch of the sub-element-hierarchy can be specified as a means to distinguish the target containing element from other instances of that element when that sub-element branch only exists in the target containing element. The sub-element branch is specified using an instance of the ChildList element, in a similar fashion to the AncestorList element, as follows:

```
<ChildList>
    <Child level="Position in child hierarchy" startTag="Start-tag of a child" />
    <Child level="Position in child hierarchy" startTag="Start-tag of another child" />
    ...
</ChildList>
```

The sub-element branch specified by the ChildList element needs only to be deep enough to provide adequate distinction between the target containing element and other instances of that element. The sub-element branch on its own, or combined with the ancestor-hierarchy (specified by the AncestorList element) and/or instance number can uniquely identify the target containing element.

Figures 4A, 4B:
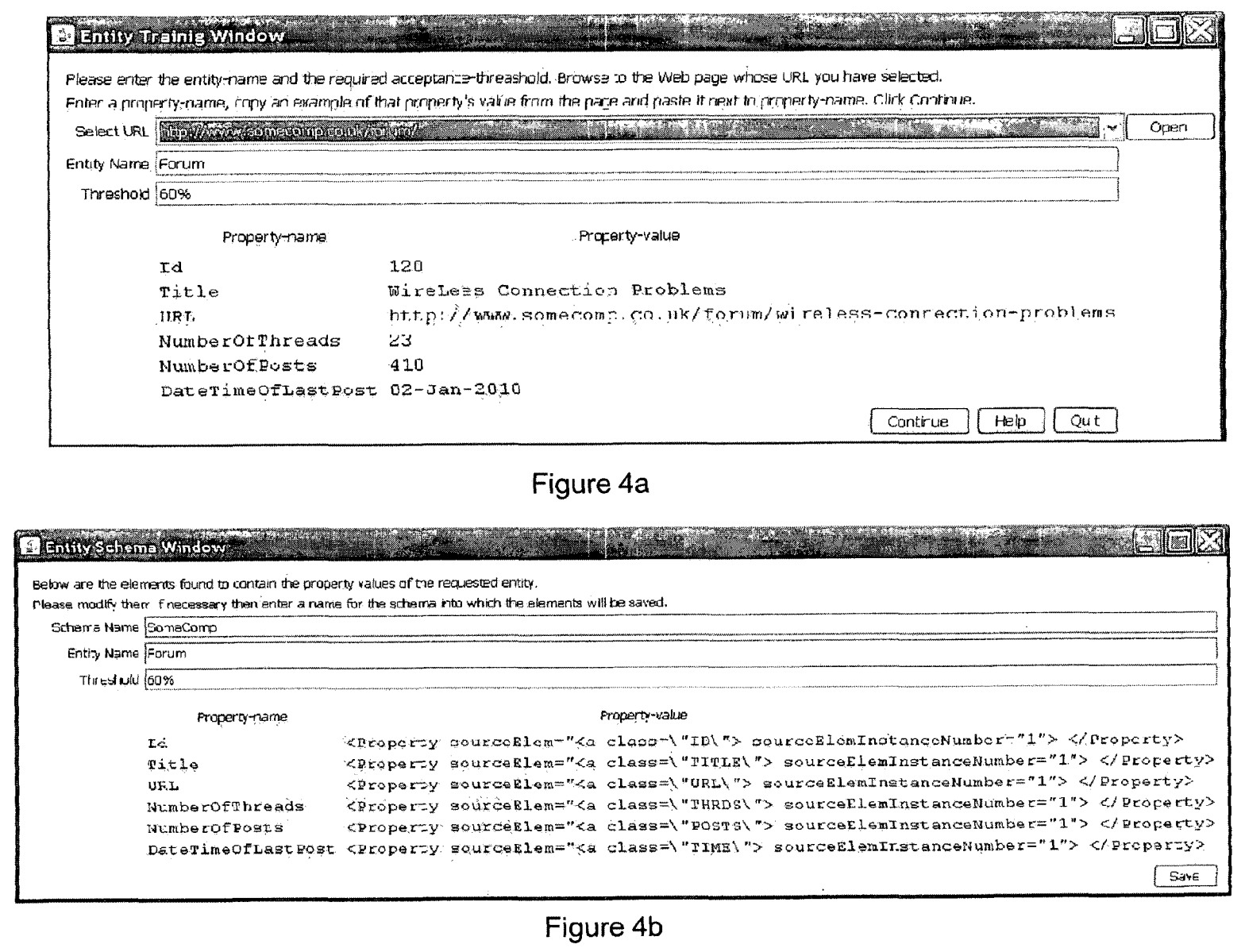

The system may be implemented such that it comprises one or more graphical user interfaces (GUIs) that allow the training process to be defined and executed. For example, one GUI may allow information regarding a target entity to be entered. Preferably, this data comprises the entity name (for example "forum"), the name of each property of that entity, an example value for that property (all the example values can be obtained from the web page whose URL is provided to the system) and a threshold value. An example of such a GUI is shown in FIG. 4a. FIG. 4b shows an example of a second GUI which shows the containing element for each property value of the entity named in the GUI shown in FIG. 4a. These containing elements are generated through the analysis of a number of example web pages. In the case of each page, its contents will be searched for the example property values provided by the user. It will be understood that the specific design of the GUIs are exemplary and do not form part of the present invention The user is able to inspect and modify any of the containing elements. Thereafter, the user saves the containing elements into a final entity CES which in turn will automatically be saved inside a source CES. The source CES acts as a container for the final entity CES of all entity types in the entity-hierarchy of a web site. The source CES may be stored in a database for use during the contents extraction phase. To be able to refer to the source CES in future, a name should be assigned to it, for example using the Schema Name field in the GUI shown in FIG. 4b.

Given a web site with N levels in its entity-hierarchy, a user can confine the information retrieved from the web site to a continuous subset of levels in the hierarchy. For example, the user may require that information retrieval should be confined to the range from level 2 to level N−1. To achieve this, the user should only select entities that populate those hierarchical levels which are of interest. Consequently, the entities in other hierarchical levels can be excluded from the training phase. Similarly, the user can select which property values of an entity should be extracted during the contents extraction phase. To achieve this, the user can train the system with only the example values of the required properties, and example values of unwanted properties can still be excluded from the training phase. In this way, the containing elements relating to unwanted properties will not be discovered and therefore their values will not be extracted.

It should be noted that at each level of the entity-hierarchy, the value of a specific property, for example a URL, of an entity, such as a forum, whose instances populate that level, provides the address of the web pages at the next level of the hierarchy. These specific properties should not be excluded from the training phase otherwise it will not be possible to obtain the addresses that are necessary for traversing the entity-hierarchy.

As was noted above, the contents of many web sites hosting discussion forums are organised in a three level hierarchy, with the first level consisting of a list of forums, with each forum consisting of a list of discussion threads, and each thread containing a list of posts or news items. Instead of using the generic Entity Training Window and Entity Schema Window, discussed above with reference to FIGS. 4a and 4b, it is also possible to create and use a Training Window and a Schema Window specific to each of these three entities, or for any entity used within the entity-hierarchy of a web site. The advantage of this approach is that users do not need to repeatedly enter the entity name and the names of the entity properties into the Training Window during each training episode. The creation of a CES which is specific to either a forum, thread or post entity follows the process that is outlined above. It will be understood that the entity (or entities) of interest and the related properties will need to be identified.

A source CES, which is generated during the training phase, is specified as an element-hierarchy using XML. The CES's element-hierarchy provides the following capabilities:

1. it includes the necessary information to uniquely identify any elements from the element-hierarchy of a web page. The necessary information includes the element's start-tag, ancestor list, child list and its instance number in case there are multiple instances of that element within the hierarchy.
2. For each element in the element-hierarchy of a web page, it is possible to specify one of the following two possibilities:
   a) the element's contents need to be extracted. Furthermore, it is also possible to specify whether the extracted contents need to be modified in the following ways to generate the target contents:
   one or more instances of a character string should be removed from the contents,
   one or more instances of a character string should be replaced with another character string,
   one or more instances of a character string should be inserted at specific index positions of the element's contents.
   a character string spanning specific index positions should be removed from the element's contents, e.g. the character string at index-positions 0 to 5 should be removed.
   only the contents of specific child-elements (of the element under consideration) should be extracted, e.g. instances 1 and 2 of child-elements with start-tag <p>.
   the contents of specific child-elements (of the element under consideration) should be removed from the element's contents.
   choose specific sub-strings, matching a selection filter, from the element's contents. The selection filter is specified as a regular expression which is composed according to the rules defined by the java.util.regex package of the Java Platform, Standard Edition 6 (Java SE 6).
   remove specific sub-strings, matching a selection filter, from the element's contents. The selection filter is a regular expression as described above.
   b) the value of one or more of its attributes needs to be extracted and then concatenated. It is also possible to specify how each attribute value should be converted into the required contents using the same mechanisms listed above for the element's contents.
3. It can specify the entities (e.g. a forum/thread/post/etc.) used in the entity-hierarchy of a web site, along with the location of each entity in the hierarchy.
4. It can individually specify the properties (e.g. id, title, URL, etc.) of each entity in the entity-hierarchy of a web site, as well as the element from the element-hierarchy of a web page which contains the value of that property.
5. For each property value, it can explicitly specify whether that value is shared amongst all instances of an entity (for example whether all posts in a web page may share the same title), or alternatively, whether each entity instance has its own respective value for that property.

The structure of a source CES, represented by its XML elements, the attributes of those elements (with dummy values) and their child-elements, is shown below. The following conventions are used:

i) Each instance of three successive dots " . . . " indicates that the preceding element can be repeated a number of times.

ii) Two or more character strings separated by vertical bars "|" indicates the alternative values for an attribute.

```
<Schema name="SomeName" version="SomeVersion">
    <EntityRelationList>
        <EntityRelation parentEntityName="SomeEntityName"
            childEntityName="SomeEntityName"
            parentEntityPropertyLocatingChildEntity="SomeProperty
NameOfParentEntity"
            locatingPropertyFilter="SomeFilter" />
        . . .
    </EntityRelationList>
    <EntityList>
        <!-- One or more instances of the Entity element each with a
distinct value for the name attribute can be specified here -->
        <Entity name="SomeEntityName"
            acceptanceThreshold="SomePrecentageValue"
            firstProperty="SomePropertyName"
            lastProperty="SomePropertyName">
            <PropertyList scope="IndividualProperties | SharedProperties">
                <!-- PropertyListContainer is an optional element -->
                <PropertyListContainer startTag="SomeStartTag"
                    startTagInstanceNumbers="SomeInstanceSpecifier">
                    <!-- AncestorList is an optional element -->
                    <AncestorList>
                        <Ancestor level="SomePositiveInteger"
                            startTag="SomeAncestorStartTag" />
                        . . .
                    </AncestorList>
                    <!-- ChildList is an optional element --> .
                    <ChildList>
                        <Child level="SomePositiveInteger"
                            startTag="SomeChildStartTag" />
                        . . .
                    </ChildList>
```

```xml
    </PropertyListContainer>
    <Property name="SomePropertyName"
        startTag="SomeStartTag"
        startTagInstanceNumbers="SomeInstanceSpecifier">
      <!-- AncestorList is an optional element -->
      <AncestorList>
        <Ancestor level="SomePositiveInteger"
            startTag="SomeAncestorStartTag" />
        ...
      </AncestorList>
      <!-- ChildList is an optional element -->
      <ChildList>
        <Child level="SomePositiveInteger"
            startTag="SomeChildStartTag" />
        ...
      </ChildList>
      <PropertyValuePartList>
        <!-- The list contains one or more instances of the
following elements -->
        <!-- Begin : Obtains value of a property of an entity -->
        <PropertyValuePart partNumber="SomePartNumber">
          <EntityPropertyValue entityName="SomeEntityName"
              propertyName="SomeProperty" />
        </PropertyValuePart>
        <!-- End -->
        <!-- Begin : Produces a literal value -->
        <PropertyValuePart partNumber="SomePartNumber">
          <LiteralValue value="SomeCharacterString" />
        </PropertyValuePart>
        <!-- End -->
        <!-- Begin : Generates a sub-string from an element's
contents/attribute-values/start-tag by mapping a regular expression over the
element's value -->
        <PropertyValuePart partNumber="SomePartNumber">
          <RegularExpressionGroupList
          source="StartTagAttributeValue | StartTag | ElementContents"
          attributeName="SomeAttributeName"
          regularExpression="SomeRegularExpression">
            <RegularExpressionGroup groupNumber="Some
GroupNumber"
                action="Select | Remove" />
            ...
          </RegularExpressionGroupList>
        </PropertyValuePart>
        <!-- End -->
        <!-- Begin : Selects contents/attribute-values of some sub-
elements of the element identified by the value of the startTag attribute of
the enclosing Property element -->
        <PropertyValuePart partNumber="SomePartNumber">
          <RelevantSubElement subElemStartTag="SomeStartTag"
              subElemType="Child | SubElement"
              subElemInstanceNumber="InstanceNumberSpecifier"
              subElemDataType="SubElementsContents | SubElementsStartTags" />
        </PropertyValuePart>
        <!-- End -->
        <!-- Begin : Removes from an element's contents the
contents/attribute-values of some sub-elements of that element -->
        <PropertyValuePart partNumber="SomePartNumber">
          <IrrelevantSubElement subElemStartTag="SomeStartTag"
              subElemType="Child | SubElement"
              subElemInstanceNumber="InstanceNumberSpecifier"
              subElemDataType="SubElementsContents | SubElementsStartTags" />
        </PropertyValuePart>
        <!-- End -->
        <!-- Begin : Replaces sub-strings in its input with other
sub-strings -->
        <PropertyValuePart partNumber="SomePartNumber">
          <ElementContentsAll /> <!-- This is an example of an
element which can provide the input to <ReplacementStringList>
element -->
          <ReplacementStringList>
            <ReplacementString currentString="SomeString"
                currentStringInstanceNumber="InstanceNumberSpecifier"
                replacementString="SomeRepalcementString" />
            ...
          </ReplacementStringList>
        </PropertyValuePart>
        <!-- End -->
        <!-- Begin : Removes sub-strings from its input where each
sub-string is identified by its start-index and end-index within the input -->
        <PropertyValuePart partNumber="SomePartNumber">
          <ElementContentsAll /> <!-- This is an example of an
element which can provide the input to <RemoveIndexRangeList>
element -->
          <RemoveIndexRangeList>
            <RemoveIndexRange startIndex="SomeIndex"
                endIndex="SomeIndex" />
            ...
          </RemoveIndexRangeList>
        </PropertyValuePart>
        <!-- End -->
        <!-- Begin : Inserts sub-strings into its input at specific
index positions -->
        <PropertyvaluePart partNumber="SomePartNumber">
          <ElementContentsAll /> <!-- This is an example of an
element which can provide the input to <InsertStringList> element -->
          <InsertStringList>
            <InsertString string="SomeString"
                insertIndex="SomeIndex" />
            ...
          </InsertStringList>
        </PropertyValuePart>
        <!-- End -->
      </PropertyValuePartList>
      <!-- Begin : Modifies the value composed by the
<PropertyValuePartList> element -->
      <PropertyValueProcessing>
        <ProcessingMethod methodUri="Some URI for invoking a
method" >
          <MethodParameter position="SomePositiveInteger"
              value="SomeValue">
          ...
        </ProcessingMethod>
      </PropertyValueProcessing>
      <!-- End -->
    </Property>
    ...
  </PropertyList>
  ...
</Entity>
...
</EntityList>
</Schema>
```

The structure and function of the various elements that comprise a CES are described in greater detail in Appendix A below.

The purpose of the training phase is to produce a source CES which can be used subsequently to extract the desired properties, for example the id, title, URL, etc., of various entities from within the entity-hierarchy of a web site. Each web site is associated with only one source CES. The training phase aims to generate a final entity CES for each entity type in the entity-hierarchy of the web site. All resulting final entity CESs will be stored in the source CES of the web site. The final entity CES for each entity type is created by performing a number of training episodes for that entity type—it is thought that performing at least three training episodes is sufficient but it will be understood that a greater number of training episodes may be performed if this is thought to be appropriate. Each training episode compares the contents of a web page against the example property values of an entity obtained from that page, which may, for example, be entered into a GUI (such as the Entity Training Window described above with reference to FIG. 4a).

Each training episode will generate a separate episode entity CES. As it is likely that the episode entity CESs will not be identical, it is necessary to derive a final version of the entity CES from the various episode entity CESs. The derivation process involves comparing each new episode entity CES with those episode entity CESs already generated by the previous training episodes. Before describing the comparison process in detail, a number of concepts will be introduced:

i) The comparison may lead to the generation of a derived entity CES. A derived entity CES is generated by merging two episode entity CESs which have been directly generated by two separate training episodes. That is, they have not been derived from other CESs. For the sake of clarity, a non-derived episode entity CES will hereafter be referred to as a basic entity CES. The process of merging two CESs will be described below.

ii) Occurrence-counter: The occurrence-counter, for either a basic or a derived entity CES, is the number of instances of that CES generated in the training phase so far.

iii) Occurrence-frequency: The occurrence-frequency of an entity CES is defined as the proportion of its occurrence-counter to the total number of CESs, both basic and derived, generated in the training phase so far. This can be expressed more formally as:

$$\frac{\text{Number of occurrences of the basic or derived entity } CES}{\text{Total number of basic and derived entity } CESs \text{ generated so far}} \quad [1]$$

iv) Acceptance threshold: The acceptance threshold is a percentage value which is specified by the user (for example via the threshold field of the Entity Training Window (see FIG. 4a)). Given a threshold of, for example, 60%, the basic or derived entity CES whose occurrence-frequency reaches 60% will be adopted as the final entity CES for the entity type under consideration.

The details of the CES comparison process will now be described. When the first basic entity CES for an entity type is generated by the first training episode, its occurrence-counter is set to 1 and accordingly its occurrence-frequency will be 100%. This CES, which can, for example, be called 'basic CES #1', will be added to the set of existing basic entity CESs.

$$\text{Set of existing basic entity CESs} = \{\text{basic CES \#1}\} \quad \{1\}$$

Thereafter, whenever a new basic entity CES is generated through a new training episode, it is compared against all CESs in set {1}. The comparison will have one of two outcomes: if the new basic entity CES fully matches a CES found in set {1} then the occurrence-counter of the fully matched CES in set {1} is incremented by 1 and its occurrence-frequency will be re-calculated accordingly. The new basic entity CES will then be discarded.

Alternatively, if the new basic entity CES does not fully match any of the CESs in set {1} then the new CES is assigned an occurrence-counter of 1, its occurrence-frequency will be calculated according to equation [1], and it will be added to set {1}. The new CES will also be compared with all other CESs in set {1} to determine whether it adequately matches one or more of them. Each CES in set {1} that adequately matches the new basic entity CES will be merged with it to generate a derived entity CES.

For example, if the new basic entity CES adequately matches only one CES in set {1}, a new derived entity CES will be generated, which may, for example, be called 'derived CES #1'. If no derived entity CES has been generated previously, then derived CES #1 will be directly added to a set of derived entity CESs:

$$\text{Set of existing derived entity CESs} = \{\text{derived CES \#1}\} \quad \{2\}$$

Each derived entity CES added to set {2} will be initially assigned an occurrence-counter of 1 and its occurrence-frequency will be calculated according to equation [1]. In subsequent training episodes, each time a new derived entity CES is generated it will first be compared against each existing derived CES in set {2}. This has one of two outcomes:

a. The new derived entity CES fully matches a derived CES in set {2}. In this case, the occurrence-counter of the matching derived CES in set {2} is incremented by 1 and its occurrence-frequency is updated according to equation [1]. The new derived entity CES will be discarded; or
b. The new derived entity CES does not fully match any derived CESs in set {2} In this case, the new derived entity CES will be added to set {2}, its occurrence-counter is set to 1 and its occurrence-frequency is calculated in accordance with equation [1].

Either of the two outcomes above will increase the sum of the occurrence-counters for both the old and new CESs in sets {1} and {2}. Therefore, as a last step, the occurrence-frequency of all CESs in sets {1} and {2} that have not been updated by the steps in the above outcomes will be adjusted according to equation [1]. Both the basic and derived entity CESs are instances of the Entity element. The element-hierarchy underneath the Entity element is described in greater detail in Appendix A below.

The hierarchy is delimited by the following start and end tags:

```
Start-tag:
  <Entity name="SomeEntityName"
    acceptanceThreshold="PercentageValue"
    firstProperty="SomePropertyList"
    lastProperty="SomeProperty">
end-tag:
  </Entity>
```

Each basic entity CES is an instance of the Entity element. This Entity element contains one or more Property elements within its sub-element-hierarchy. Each of these Property elements has a startTag attribute. The value of the startTag attribute is the start-tag of the containing element for a property value (e.g. date/title/etc.) of an entity (e.g. forum/thread/post/etc.) on a web page. The value of the startTag attribute is obtained from a web page during a training episode.

For example, during a training episode the user may enter the URL of a web page and example property values for a post entity in that page. The example value for the date property could be the character string "28-11-10 10:44 PM". A method according to the present invention might find the following containing element for the value of the date property in that web page:
<div align="right" style="white-space:nowrap">28-11-10 10:44 PM</div>

Such a method would inspect the start-tag of the above element, i.e. <div align="right" style="white-space:nowrap">, to find any character with special semantics according to the rules defined by the java.util.regex package of the Java SE 6. These characters with special semantics include: . * + ? \ ( ) [ ] { } $ ^. Each instance of these characters will be escaped by inserting a backslash character before it. This process removes the semantic meaning associated with a character. For example, the string "9+" matches a character string comprising one or more 9's, for example "99" or "99999". However, the "+" in "9\+" has been escaped which removes the special semantics of "+" and thus "9\+" only matches the string "9+", not "99", or "99999". The resulting string will be stored as the value of the startTag attribute of a Property element as follows:

```
<Property    name="Date"
             startTag="<div align="right"
             style="white-space:nowrap">"
             startTagInstanceNumbers="1">
```

In the above Property element, the value of the name attribute specifies the name of the property under consideration. It may be possible to also determine both the ancestor list of the containing element and its instance number. The ancestor list will be specified through an instance of AncestorList element. The value 1 for the startTagInstanceNumbers attribute indicates that the first instance of the element (in the element-hierarchy of the web page) whose start-tag is the same as the value of the startTag attribute is the containing element for the example value of the date property. The URL of the web page in which the containing element was found will also be associated, with the above Property element in memory but it will not become part of the Property element itself. The above Property element will be stored within an instance of the Entity element for the post entity.

The above process is repeated for each exemplary property value and the resulting Property elements will be stored within the same Entity element. The relative position of the property values with respect to each other in the web page may also be determined. It might, for example, be determined that the date property value appears first and the contents property value appears last. This information will be stored as the value of the firstProperty and lastProperty attributes of the Entity element. At this point, the task of creating the basic entity CES is completed. An example of a basic entity CES (called basic entity CES #1) for the post entity, containing three property elements, is presented below.

Basic entity CES #1:

```
<Entity name="Post"
    acceptanceThreshold="60%"
    firstProperty="Date"
    lastProperty="Contents">
    <!-- 1st Property element in CES #1:
    <Property name="Date"
        startTag="<div align="right" style="white-space:nowrap">"
        startTagInstanceNumbers="1">
    <!-- 2nd Property element in CES #1 -->
    <Property name="PostID"
        startTag="<a name="post137660">"
        startTagInstanceNumbers="1">
    <!-- 3rd Property element in CES #1:
    <Property name="Contents"
        startTag="<div id="post_message_137660">"
        startTagInstanceNumbers="1">
</Entity>
```

A derived entity CES is an instance of the Entity element. It is generated by merging two basic entity CESs. Two basic entity CESs (i.e. two instances of the Entity element) can be merged to create a derived entity CES if the following conditions hold:

i) The start-tag of the Entity element representing the first CES is identical to the start-tag of the Entity element representing the second CES.

ii) The two CESs, as expressed by the respective Entity elements, contain identical sub-element-hierarchies, that is, each element at level N of the sub-element-hierarchy of the first CES has an identical counter-part at same level of the sub-element-hierarchy of the second CES. The only exception to this rule concerns the Property elements in the two sub-element-hierarchies, as described below.

iii) The two CESs should contain the same number of Property elements in their respective sub-element-hierarchies. Each Property element in the first CES has a corresponding Property element in the second CES. The Property elements in each of the two CESs fall into one of four categories. There must be at least one Property element in at least one of the categories 2, 3 or 4 in each CES.

a. Category 1: Each Category 1 Property element of the first CES is identical to a further Category 1 Property element of the second CES with respect to their start-tags, ancestor-lists, child-lists and sub-element-hierarchies. The merger of the two Property elements will result in a Property element which is identical to them. The resulting Property element will be stored in the derived entity CES.

b. Category 2: Each Category 2 Property element of the first CES is identical to a further Category 2 Property element in the second CES with respect to their sub-element-hierarchies, ancestor-lists, child-lists and the values of all attributes except for the value of startTagInstanceNumbers attribute. Also, the URL of the two web pages from which the two Property elements are generated should be identical. This corresponds to a situation where multiple instances of an entity, e.g. multiple posts, exist within the same web page. Each entity instance, for example a post, has its own instance of each property, for example its own date. Different instances of each property (e.g. different dates) will be contained by separate instances of the same containing element. This results in different values for the startTagInstanceNumbers attribute.

The merger of the two Property elements will create a Property element which is identical to both of them except for the value of the startTagInstanceNumbers attribute, which will be set to −1 thus indicating all instances. The resulting Property element will become part of the derived entity CES. For example, the following two Property elements are in category 2 (for the sake of clarity only their start-tags are presented):

```
<Property name="Date"
    startTag="<div align="right" style="white-space:nowrap">"
    startTagInstanceNumbers="1">
<Property name="Date"
    startTag="<div align="right" style="white-space:nowrap">"
    startTagInstanceNumbers="2">
```

Their merger results in creation of the following Property element:

```
<Property name="Date"
    startTag="<div align="right" style="white-
    space:nowrap">"
    startTagInstanceNumbers="-1">
``` c. Category 3: Each Category 3 Property element of the first CES is identical to a further Category 3 Property element of the second CES with respect to their sub-element-hierarchies, ancestor-lists, child-lists and the values of all attributes except for the value of startTag attribute. The two values of the startTag attribute in the two Property elements, although different, must share one or more sub-strings, each having a length of 1 or more. Each sub-string should span the same index positions in both values. For example, the following two Property elements are in category 3 (again, for the sake of clarity only their start-tags are presented):

```
<Property    name="PostID"
             startTag="<a name="post137646">"
             startTagInstanceNumbers="1">
<Property    name="PostID"
             startTag="<a      name="post137660">"    [
startTagInstanceNumbers="1">
```

The two values of the startTag attribute, although different, share two identical sub-strings:
<a name="post1376: spanning index positions 0 to 16 in both values.
">: spanning index positions 19 to 20 in both values.
The two values have different sub-strings spanning index positions 17 and 18, namely, "46" and "60". Thus, a new Property element can be generated which is identical to both of these Property elements except for the value of its startTag attribute which would be set to the following regular expression, which is Java SE 6 compliant:
<a name="post ([0-9]+)">
This regular expression consists of three sub-strings:
1) <a name="post: This sub-string is shared between the values of the startTag attributes in the two Property elements. It spans the same index positions (0 to 12) in the two attributes' values. The sub-string will be referred to as a literal sub-string because it is directly extracted from the two attributes' values. It will match one instance of itself in other strings.
2) ([0-9]+): This is a regular expression that (when compiled) will match any sequence of one or more decimal digits in other strings.
3) ">: This is another literal sub-string shared between the values of the startTag attributes in the two Property elements. It will match one instance of itself in other strings.
As is evident by the above example, it is possible to generate regular expressions which exclude numerical sub-strings (e.g. "1376" in the above example) from the literal sub-strings of the regular expressions, even if those numerical sub-strings are shared between, and span the same index positions in, the values of the startTag attributes in the two Property elements. This is due to the fact that when a containing element's start-tag comprises a combination of numerical and non-numerical sub-strings, the numerical sub-strings normally represent one or more sequence numbers that are used to uniquely identify a specific instance of an entity. This means that these numerical sub-strings have different values for each entity instance. For example, each instance of the post entity, within a thread entity, usually includes a unique identifier as part of one of its property values, for example as part of the value of the post ID property. For this reason, numerical sub-strings are excluded from the literal sub-strings of the regular expressions and are instead represented by Java compliant constructs within the regular expression.

The value of the startTagInstanceNumbers attribute of the Property element resulting from the merger of two Category 3 Property elements would be set to −1, indicating all instances. This is the case for the Property element shown below which is the result of merging the above two category 3 Property elements discussed above.

```
<Property    name="PostID"
             startTag="<a name="post ( [0-9]+)">"
             startTagInstanceNumbers="-1">
``` d. Category 4: Each Category 4 Property element found within the first CES is identical to a further Category 4 Property element found within the second CES with respect to their sub-element-hierarchies, ancestor-lists, child-lists and the values of all attributes except for the values of the startTag and startTagInstanceNumbers attributes. Thus, it can be seen that Category 4 elements comprise the characteristics found in Category 2 and Category 3 elements. Accordingly, the Property elements in category 4 must fulfil the requirements of categories 2 and 3. An example of a pair of Property elements in category 4 are:

```
<Property name="Contents"
    startTag="<div id="post_message_137646">"
    startTagInstanceNumbers="1">
<Property name="Contents"
    startTag="<div id="post_message_137660">"
    startTagInstanceNumbers="2">
```

Their merger results in the following Property element:

```
<Property name="Contents"
    startTag="<div id="post_message_([0-9]+)">"
    startTagInstanceNumbers="-1">
```

The value of the startTagInstanceNumbers attribute has been set to −1. This is regardless of whether the URLs of the two web pages from which the two Category 4 Property elements have been generated are identical or not.

Each basic or derived CES is an instance of the Entity element. Two basic entity CESs, or two derived entity CESs, fully match each other if the tag-name, attribute names and values, sub-element-hierarchy (including ancestor-list, child-list) and the contents of the first CES is identical to those in the second one. This condition can be tested for by comparing for equality the two character strings representing the two CESs. Before the comparison commences, any sub-string in the two character strings comprising two or more consecutive whitespace characters (i.e. space, tab, etc.) should be substituted with a single space character.

Furthermore, two basic entity CESs can be said to adequately match each other if they can be merged to create a derived entity CES according to the creation rules described above. The merger process is limited in its scope to basic entity CESs. It does not attempt to merge a derived entity CES with another derived/basic CES. Merging two derived entity CESs is not considered in the present invention because it unnecessarily complicates the comparison and merging algorithms.

An example of how a derived entity CES can be used to extract the properties of two instances of a post entity will now be given. The derived entity CES for the post entity can be found in Appendix B (see below) between the following start and end tags:

```
start-tag:
    <Entity name="Post" acceptanceThreshold="60%"
    firstProperty="Date"
    lastProperty="Contents">
end-tag:
    </Entity>
```

The above Entity element contains eight Property elements, and also indicates which one is the first and last property. The value of the name attribute of each Property element specifies a property name of the post entity. The value of the startTag attribute of each Property element specifies the start-tag of the containing element for that property. Each Property element may include an AncestorList element and/or a ChildList element. These six pieces of information are listed in Table 1 below:

An example of the input data containing the properties of the two instances of the post entity is presented below. The input data is in the form of a character string containing a number of HTML elements. The elements are used for two purposes: firstly, they enclose the values of the properties listed in the first column of the Table 1 above; secondly, they provide formatting and structuring information for displaying the string as a web page via a web browser.

```
<html xmlns="http://www.w3.org/1999/xhtml" dir="ltr" lang="en">
    <head>
        <!-- post #1 -->
        <div id="edit1001" style="padding:4px 0px 4px 0px">
            <table id="post1001" class="tborder" cellpadding="2" cellspacing="1" border="1" width="75%" align="center">
                <tr>
                    <td class="thead" style="font-weight:normal; border: 2px solid #D1D1E1; border-right: 1px" >
                        <div align="left" style="white-space:nowrap">
                            <a name="post1001">
                                <img class="inlineimg" src="http://www.someco.com/images/statusicon/post.gif" border="1" />
                            </a>
                            29-03-10, 11:01 AM
                        </div>
                    </td>
                    <td class="thead" style="font-weight:normal; border: 1px solid #D1D1E1; border-left: 0px" align="right">
                        (
                        <a href="http://www.someco.com/forums/forum_33/thread_101.html#post1001" title="Link to this Post">permalink #1</a>
                        )
                    </td>
                </tr>
                <tr valign="top">
                    <td class="alt2" width="350" style="border: 1px solid
```

TABLE 1

Information about Property elements within post's Entity element

| Value of name attribute (i.e. property name) | Value of startTag attribute (i.e. start-tag of the containing element) | AncestorList specified | ChildList specified | First property | Last property |
|---|---|---|---|---|---|
| Date | <div align="left" style="white-space:nowrap"> | Yes | No | Yes | No |
| PostID | <a name="post([0-9]+)"> | No | No | No | No |
| ThreadID | <a href="http://www.someco.com/forums/forum_([0-9]+)/thread_([0-9]+).html#post([0-9]+)" title="Link to this Post"> | No | No | No | No |
| URL | <a href="http://www.someco.com/forums/forum_([0-9]+)/thread_([0-9]+).html#post([0-9]+)" title="Link to this Post "> | No | No | No | No |
| Title | <div class="smallfont"> | No | No | No | No |
| Author | <a rel="nofollow" class="bigusername" href="http://www.someco.com/members/(.*)\.html"> | No | No | No | No |
| AuthorURL | <a rel="nofollow" class="bigusername" href="http://www.someco.com/members/(*)\.html"> | No | No | No | No |
| Contents | :<div id="post_message_([0-9]+)"> | No | No | No | Yes |

-continued

```
#C1C1D1; border-top: 1px; border-bottom: 1px">
        <div id="postmenu_1001">
            <a rel="nofollow" class="bigusername"
href="http://www.someco.com/members/alpha01.html">alpha01</a>
        </div>
        <div class="smallfont">
            <strong>Internet marketing</strong>
        </div>
        <div id="post_message_1001">
            Internet marketing is very important, what do you
think?
        </div>
    </td>
</tr>
</table>
</div>
<!-- post #2 -->
<div id="edit1002" style="padding: 4px 0px 4px 0px">
    <table id="post1002" class="tborder" cellpadding="2"
cellspacing="1" border="1" width="75%" align="center">
        <tr>
            <td class="thead" style="font-weight:normal; border: 2px
solid #D1D1E1; border-right: 1px" >
                <div align="left" style="white-space:nowrap">
                    <a name="post1002">
                        <img class="inlineimg"
src="http://www.someco.com/images/statusicon/post.gif" border="1" />
                    </a>
                    29-03-10, 11:55 AM
                </div>
            </td>
            <td class="thead" style="font-weight:normal; border: 1px solid
#D1D1E1; border-left: 0px" align="right">
                (
                <a
href="http://www.someco.com/forums/forum_33/
thread_101.html#post1002"
title="Link to this Post">permalink #2</a>
                )
            </td>
        </tr>
        <tr valign="top">
            <td class="alt2" width="350" style="border: 1px solid
#C1C1D1; border-top: 1px; border-bottom:1px">
                <div id="postmenu_1002">
                    <a rel="nofollow" class="bigusername"
href="http://www.someco.com/members/beta01.html">beta01</a>
                </div>
                <div class="smallfont">
                    <strong>re: Internet marketing</strong>
                </div>
                <div id="post_message_1002">
                    <div style="margin:20px; margin-top:5px; ">
                    <div class="smallfont" style="margin-
bottom:2px">Quote:</div>
                    <table cellpadding="6" cellspacing="0" border="1"
width="100%">
                        <tr>
                            <td class="alt2" style="border:1px inset">
                                <div>
                                    In response to:<br />
                                </div>
                                Internet marketing is very important, what do
you think? <br />
                            </td>
                        </tr>
                    </table>
                </div>
                Yes, it is getting more important everyday!
                </div>
            </td>
        </tr>
    </table>
</div>
</head>
            </html>
```

The properties of the two posts can be extracted from the above input data string using the following algorithm:

i) Each start-tag in the second column of Table 1 is the value of the startTag attribute of a Property element within the post's Entity element. Each one can be treated as a Java SE 6 compliant regular expression, and is compiled into a regular expression pattern.

ii) The input string is scanned to identify all HTML-elements that it contains. For each identified HTML-element the following steps will be undertaken:

iii) The HTML-element's start-tag is compared, according to the matching rules of Java SE 6, with each regular expression pattern generated in step (i). Each time the start-tag fully matches a regular expression pattern, the following tests will be carried out in the following order.

iv) The Property element associated with the matching regular expression pattern in (iii) may contain an AncestorList element. If so, the list of ancestors specified by this AncestorList element will be compared with the ancestors of the HTML-element. If they are identical to each other then the described below in step v) will be carried out.

V) The Property element may contain a ChildList element. If so, the list of children specified by the ChildList element will be compared with the children-hierarchy of the HTML-element. If the former is found to be a branch within the latter then the described below in step vi) will be carried out.

vi) If the value of the name attribute of Property element is "Date", a new post object will be created because "Date" is included in the value of the firstProperty attribute of the Entity element. The value of the Date property will be stored in the post object.

vii) If the value of the name attribute of Property element is neither "Date" nor "Contents" and a post object already exists, then that post object will be used to store the value of this property (e.g. postID).

viii) If the value of the name attribute of Property element is "Contents" the post object created in (vi) will be used to store the post's contents. The post object should now include all properties of the first instance of the post entity. The object will then be saved in, for example, a database to be used later. The post object is then discarded. The operation will resume from step (iii) in order to find the properties of the second post.

An example of how the above algorithm can be used is now given. It involves using the derived entity CES for the post entity (detailed in Appendix B below) to extract the values of date, post ID and contents properties of a post from the input data presented above. The purpose of each attribute and sub-element of the Property element is described in more detail in Appendix A below.

Appendix B defines the Property element for the date property as follows:

```
<Property  name="Date"
        startTag="<div align="left" style="white-space:nowrap">"
        startTagInstanceNumbers="-1">
    <AncestorList>
<Ancestor level="1" startTag="<td class="thead" style="font-
weight:normal; border: 2px solid #D1D1E1; border-right: 1px" />
    </AncestorList>
    <PropertyValuePartList>
        <PropertyValue Part partNumber="1">
            <ElementContentsAll />
        </PropertyValuePart>
    </PropertyValuePartList>
    <PropertyValueProcessing>
        <ProcessingMethod methodUri="http://localhost/convertDate">
            <MethodParameter position="1" value="PropertyValuePartList">
```

-continued

```
    <MethodParameter position="2" value="dd-MM-yy hh:mm a">
<!--
Example: 23-10-10 12:25 PM -->
      </ProcessingMethod>
    </PropertyValueProcessing>
</Property>
```

In the example input data shown above, the HTML-element with start-tag
<div align="left" style="white-space:nowrap">
fully matches the value of the startTag attribute of the above Property element. Furthermore, the HTML-element has the element with start-tag
<div align="left" style="white-space:nowrap">
as its parent, as required by the <AncestorList> sub-element of the Property element. Therefore, a post object is created to store the value of Date property. This value, according to the <PropertyValuePartList> sub-element of the Property element, consists of only one part. The element <ElementContentsAll/> indicates that the value is the whole of the contents of the HTML-element, i.e. "29-03-10, 11:01 AM". This value, along with the string "dd-MM-yy hh:mm a", will be passed to the method convertDate. The result returned by the method will be stored in a newly created post object, because Date is named as a first property of the post entity (see Table 1 above).

Appendix B defines the Property element for the postID property as follows:

```
<Property                    name="PostID"
                             startTag="<a name="post([0-9]+)">"
                             startTagInstanceNumbers="-1">
  <PropertyValuePartList>
    <propertyValuePart              partNumber="1">
      <RegularExpressionGroupList source="StartTag"  attributeName=""
                                  regularExpression="StartTagRegularExpression">
        <RegularExpressionGroup  groupNumber="1"  action="Select" />
      </RegularExpressionGroupList>
    </PropertyValuePart>
  </PropertyValuePartList>
</Property>
```

In the example input data shown above, the HTML-element with start-tag
<a name="post1001">
fully matches the value of the startTag attribute of the above Property element. The value of postID, according to the <PropertyValuePartList> sub-element of the Property element, consists of only one part. This value can be obtained in two steps. First, the attribute
regularExpression="StartTagRegularExpression"
indicates that the regular expression defined as the value of the startTag attribute (i.e. <a name="post ([0-9]+)">) should be applied to the value of the start-tag (indicated by source="startTag") of the HTML-element (i.e. <a name="post1001">). Second, the first capturing group of the applied regular expression (indicated by groupNumber="1") should be selected (indicated by action="Select") as the postID value which is 1001. This value is stored in the post object created when the value of the data property was obtained.

Appendix B defines the Property element for the contents property as follows:

```
<Property     name="Contents"
              startTag="<div id="post_message_([0-9]+)">"
              startTagInstanceNumbers="-1">
  <PropertyValuePartList>
    <PropertyValuePart partNumber="1">
      <IrrelevantSubElement subElemStartTag="<div style="margin:
20px;
margin-top:5px; ">"
              subElemType="Child"
              subElemInstanceNumbers="-1"
              subElemDataType="SubElementsContents" />
    </PropertyValuePart>
  </PropertyValuePartList>
</Property>
```

In the example input data shown above, the HTML-element with start-tag <div id="post_message_1001"> fully matches the value of startTag attribute of the above Property element.

The value of the contents property, according to the <PropertyValuePartList> sub-element, consists of only one part and is obtained in two steps. First, all instances of the irrelevant sub-element with start-tag <div style="margin:20px; margin-top:5px;"> are identified within the HTML-element. Next, the contents of each instance will be removed from the contents of the HTML-element. The remaining value of the HTML-element will be used as the value of the contents property. In this case, since there are no instances of the irrelevant sub-element, the value of the contents property is:

"Internet marketing is very important, what do you think?".

This process can be repeated to extract all properties of both posts. The result is shown below in Table 2:

TABLE 2

| | Extracted post properties | |
|---|---|---|
| | Post #1 | Post #2 |
| Date | Result of calling http://localhost/convertDate("29-03-10, 11:01 AM", "dd-MM-yy hh:mm a") | Result of calling http://localhost/convertDate("29-03-10, 11:55 AM", "dd-MM-yy hh:mm a") |

TABLE 2-continued

Extracted post properties

|  | Post #1 | Post #2 |
|---|---|---|
| PostID | 1001 | 1002 |
| ThreadID | 101 | 101 |
| URL | http://www.someco.com/forums/forum_33/thread_101.html#post1001 | http://www.someco.com/forums/forum_33/thread_101.html#post1002 |
| Title | Internet marketing | re: Internet marketing |
| Author | alpha01 | beta01 |
| AuthorURL | http://www.someco.com/members/alpha01.html | http://www.someco.com/members/beta01.html |
| Contents | Internet marketing is very important, what do you think? | Yes, it is getting more important everyday! |

Once the final entity CES for all entity types used by a web site has been determined and stored in a source CES, the correctness of the source CES can be validated. During the training phase the user will have provided the name of an entity and associated property names, exemplary property values, the URLs of the web pages from which those values had been obtained, etc and all of this information is saved. At the end of the training phase, the individual entity CESs within the source CES will be used to extract the values of the properties from the same web pages for each entity. If the extracted values are not identical to the example property values previously entered by the user then the user may be consulted to modify the source CES.

Once the final entity CES for all entity types used by a web site has been validated and stored in a source CES then it is possible to begin the contents extraction phase, during which content will be extracted from the web sites whose contents meet the criteria defined in those final entity CESs. In order for the contents of a web site, or web sites, to be extracted it is necessary to specify the address of the root page of the web site(s) and the source CES that is to be used to extract content from that web site.

The target web site will be scanned to extract those instances of entity types which match the entity types specified in the source CES. The extracted entity instances can then be stored within a local database. These entity instances may be individual posts, threads comprising one or more posts, a forum comprising a number of threads, an entry on a social networking site, a microblogging entry (such as a tweet, for example), a document held on a web site, a news item, etc. As a typical web site may hold very large volumes of data, the first scan of a web site may extract all the entities within the web site. Subsequently, an incremental scan may be performed, with only those entities which are new, or have been changed since the previous scan, being extracted. Only those instances which have not previously been extracted will be copied to a local database. In the case of an entity that has been changed, the newest instance of that entity will be stored within the local database. Earlier instances of that entity may be deleted or stored within an archive.

FIG. 5 shows a schematic depiction of a communications network comprising a system 500 according to the present invention, which is in communication with a plurality of different websites and other online data repositories 610 and one or more CES databases 610. It will be understood that a business or enterprise may deploy a plurality of systems 500 according to the present invention. Each of these systems 500 may have its own dedicated CES database or alternatively there may be one or more CES databases which are accessed by each of the systems. A remote user may interact with and operate the system using a remote terminal 630, which may comprise a conventional personal computer, or similar, which is in communication with the system, for example via a LAN or a WAN, such as the internet.

Figure 6:
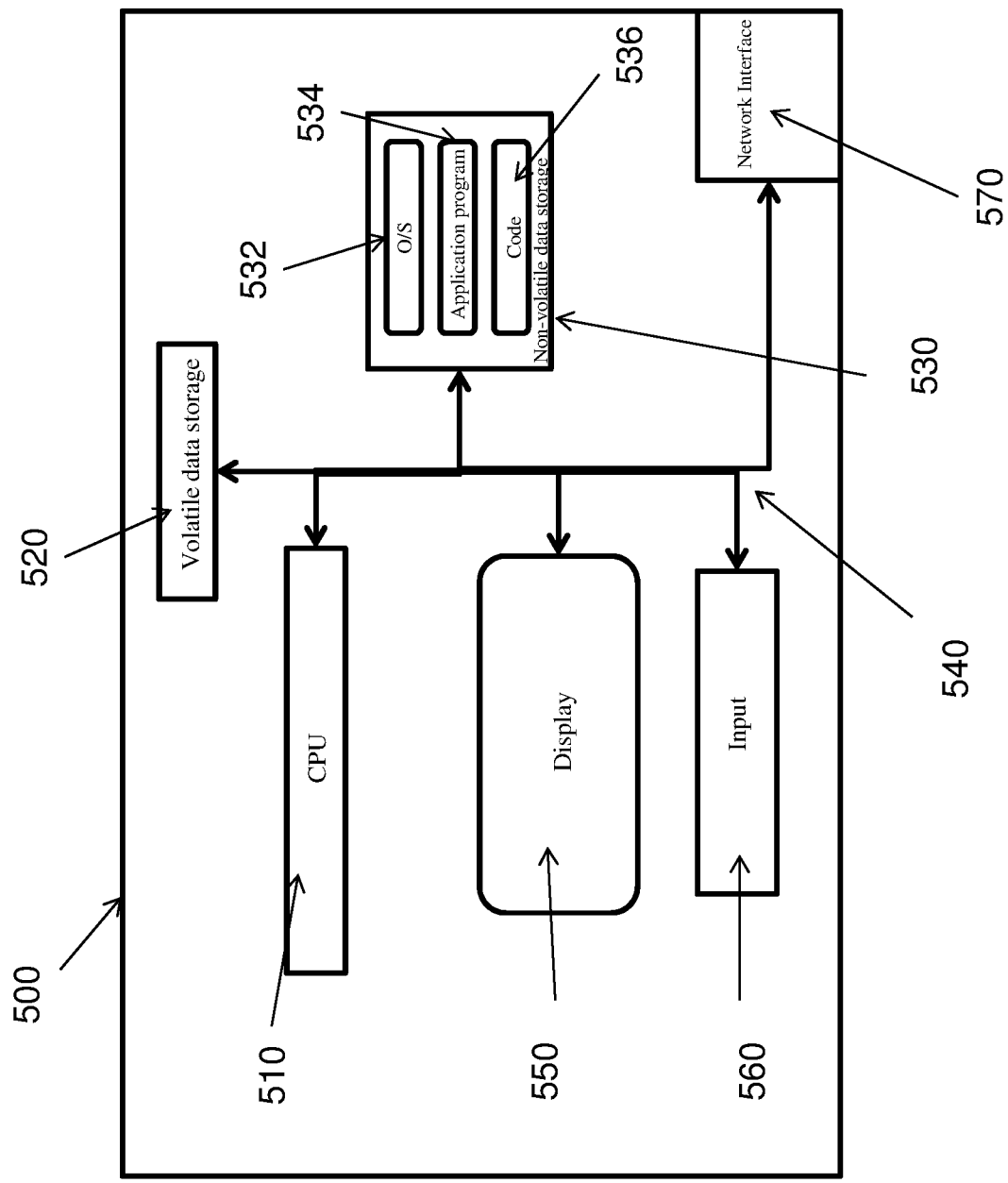
FIG. 6 shows a schematic depiction of a system according to the present invention.

FIG. 6 shows a schematic depiction of a system 500 according to the present invention, which comprises one or more central processing units 510, volatile data storage means 520 and non-volatile data storage means 530, which are interconnected by data bus 540. The system further comprises one or more network interfaces 570, which enable communication with the plurality of websites 610, CES database 620 and a remote terminal 630. The network interface(s) may be a local area network adaptor, with the LAN being connected to other LANs and wide area networks (WANs) to enable the apparatus to communicate with and exchange data with other computers. Alternatively, the network interface may be a DSL modem, or similar, that provides a connection to a WAN, such as the Internet or an intranet, which enables communications with further networks. The non-volatile data storage means may comprise one or more hard disc drives; in addition there may be provided removable non-volatile data storage means, such as removable hard disc drives or optical media (for example re-writable or recordable DVDs).

The non volatile data storage means 530 comprises an operating system 532 and one or more application programs 534. The operating system comprises the software that the computing apparatus requires to operate, communicate with other computers, receive input from users, display outputs and results to users, etc. Application programs 534 can be executed by the apparatus in order to provide additional functionality. Non volatile data storage means 530 further comprises computer code 536 which can be executed in order to perform a method according to the present invention, for example such as the one described above. It will be understood that the computer code 536 may comprise a single integrated application, or a number of different modules that are accessed separately to execute a method according to the present invention. Each module may perform the functionality of one or more of the processes which comprise the present invention.

The system may further comprise display means 550 and user input means 560 so that it can be configured or operated without a remote terminal. The apparatus may comprise integrated display means and user input means, for example a touch screen, or they may be separate, for example a conventional display screen and a keyboard and/or mouse.

The preceding discussion describes how instances of three different entities from a web site, that is, forums, threads, posts (or documents, news items, etc.) can be extracted automatically. However, it should be understood that the present invention is not limited to these types of entity.

Instances of any other entity can also be extracted from the entity-hierarchy of a web site. In order to facilitate this, it is necessary to create:
i) A new Entity Training Window to define both example values for each property of the new entity type as well as the address of the web page from which these values are obtained. The window will be populated with new data several times (at least three) during the training phase. On each occasion the user enters new values for each of the properties as well as the address of the web page from which they are obtained.
ii) A new Entity Schema Window to display the containing element for each property value of the new entity type. The properties displayed in this window correspond to those in the Entity Training Window above. The containing element for each property is automatically generated by examining the contents of the web pages against the example property values entered through the Entity Training Window.

In summary, the present invention provides a method, and an associated apparatus configured to implement such a method, for analysing mark-up language text content, such as might be found on a website or within online user generated content. The method comprises a training phase, in which plurality of schemas are automatically generated from a specified text and a final schema is compiled. This final schema can then be used to compare with other online text content such that content which matched the final schema can be identified, for example for further analysis and comparison.

APPENDIX A: CONTENTS EXTRACTION SCHEMA STRUCTURE

1. Schema Element: Each contents extraction schema (CES) contains an instance of the Schema element at the root of its element-hierarchy. The element's start-tag is:
<Schema name="SomeName" version="SomeVersion">
and its end tag is </Schema>. The attributes of this element are:
i) name: The value of this attribute specifies the name of this schema.
ii) version: The value of this attribute identifies the version of the Schema element. It allows different versions of the Schema element to be generated over time and processed accordingly.

The Schema element contains one instance of the EntityRelationList element and one instance of the EntityList element. These are described below.

1.1. EntityRelationList Element: The EntityRelationList element is used to describe the entity-hierarchy of a web site. This element has no attributes. The EntityRelationList element may contain one or more instances of the EntityRelation element as child-elements.

1.1.1. EntityRelation Element: The EntityRelation element is used to specify the parent-child relationship between pairs of entities within the entity-hierarchy of a web site. This element has four attributes and no child-element. The roles of these attributes are:
i) parentEntityName: The value of this attribute identifies an entity within the entity-hierarchy.
ii) childEntityName: The value of this attribute identifies an entity within the entity-hierarchy which is a child entity of the entity named by the parentEntityName attribute.
iii) parentEntityPropertyLocatingChildEntity: The value of this attribute identifies a property of the parent entity. The value of this property is the address of a web page that contains the instances of the child entity for the parent entity.
iv) locatingPropertyFilter: The value of this property is a regular expression which is composed according to the rules defined by the java.util.regex package of the Java Platform, Standard Edition 6 (Java SE 6). The regular expression will be compiled and the resulting pattern will be applied to the value of the property named by the parentEntityPropertyLocatingChildEntity attribute during the contents extraction phase. Only if the property value fully matches the regular expression pattern, the property value will be used to retrieve the web page containing the instances of the child entity.

As an example, the following

```
<EntityRelation    parentEntityName="Forum"
                   childEntityName="Thread"
                   parentEntityPropertyLocatingChildEntity="URL"
                   locatingPropertyFilter="(.*)marketing(.*)" />
``` indicates that the thread entity is a child of the forum entity, and the value of the URL property of the Forum entity is the address of the web page containing the instances of the thread entity within the Forum entity. The value of the locatingPropertyFilter attribute is a filter that should be applied to the forums' URLs. The filter allows only those forum URLs containing the string "marketing" to be used to obtain the thread instances in a forum. The filter string "(.*)" matches zero or more instances of any character.

1.2. EntityList Element: The EntityList element acts as a container for one or more instances of the Entity element. It has no attributes.

1.2.1. Entity Element: This element acts as a container for the specification of the containing elements for the property values (e.g. title, URL, date, etc.) of an entity (e.g. a forum/thread/post/news-item/etc.) on a web page. This entity will be referred to as the target entity in the following sections. The attributes of the Entity element are:
i) name: The value of this attribute identifies the target entity. Examples of this value are "Forum", "Thread" and "Post". For example, "Forum" indicates that the Entity element is to contain the specification of the containing elements for the values of a forum's properties (e.g. its title, number of threads, etc.). These containing elements will be used to identify and extract the property values from a web page during the contents extraction phase.
ii) acceptanceThreshold: The value of this attribute is a percentage value such as "60%". This value is interpreted as follows. Let us assume the total number of basic and derived entity CESs generated for the target entity during the training phase is N. In that case, the basic/derived entity CES that is selected as the final entity CES for the target entity should have an occurrence-frequency of at least 60%, in other words, it should be generated at least N 60% times during the training phase. The value of this attribute is specified by the user during the training phase. Choosing larger values for this attribute would ensure that a method according to the present invention would select the basic/derived entity CES that has been generated more frequently, and hence, that entity CES would have a higher probability of being the correct choice.
iii) firstProperty: Each instance of the target entity has one or more properties (e.g. title, URL, etc.). One or more of these properties can be named (separated by commas) as the value of the firstProperty attribute. The named properties (e.g. title) appear first (among the set of properties of the target entity) on a web page. The value of this attribute is used when:
  a) multiple instances of the target entity might exist on a web page (e.g. multiple forums, threads or posts).
  b) each entity instance has multiple properties, e.g. title, date, number of posts, number of views, etc.
  c) it is necessary to know which of those properties would mark the start of an entity instance's list of properties on the web page. The list would include multiple properties (as opposed to a single one) if the values of those properties can be obtained from the same containing element on the web page.
iv) lastProperty: The value of the lastProperty attribute names the target entity's property (e.g. date) that appears last (among the set of properties of that entity) on a web page. The rationale for its use is similar to that of the firstProperty. The difference is that it is used to determine whether all properties of an entity instance have been obtained from the web page.

1.2.1.1. PropertyList Element: In an entity CES the PropertyList element acts a container for two types of elements: zero or one instance of the PropertyListContainer element, and one or more instances of the Property element. Each instance of these two element types identifies an element on a web page. Each instance of Property element identifies an element on a web page, where that element contains the value of a property (e.g. title) of the target entity (e.g. a forum/thread/post). The only instance of the PropertyListContainer element (if present), identifies an element on a web page where that element contains all elements on the web page identified by the instances of the Property element that are defined within the enclosing PropertyList element. The PropertyList element has only one attribute:
i) scope: This attribute takes one of two values: "SharedProperties" and "IndividualProperties". The former indicates that the value of one or more properties (e.g. title, URL, etc.) obtained from a web page (by using the relevant instances of the child Property element of the PropertyList element as the containers of those values) should be shared between all instances of the target entity. The target entity is identified by the name attribute of the enclosing Entity element. An example is when all instances of the post entity (that are related to a specific thread) on a web page share the same title.
  The value "IndividualProperties" signifies that each instance of the target entity (e.g. a post) on a web page has its own separate value for one or more properties obtained from the web page by using the relevant instances of the child Property element of the PropertyList element. For example, each instance of the post entity has its own date, author, etc.

1.2.1.1.1. PropertyListContainer Element: The PropertyListContainer element is an optional child of the PropertyList element in an entity CES. It identifies one or more instances of a specific element in the element-hierarchy of a web page. Each instance contains one set of instances of the elements identified by the Property elements that are defined within the enclosing PropertyList element. If the PropertyListContainer element is not specified in a PropertyList element then it is assumed that no single element within the element-hierarchy of the web page contains a set of instances of the elements identified by the Property elements. The PropertyListContainer element has two attributes:
i) startTag: The value of this attribute is a regular expression. This regular expression is composed according to the rules defined by the java.util.regex package of the Java Platform, Standard Edition 6 (Java SE 6). The regular expression is used to identify the instances of the PropertyListContainer element in the context of the element-hierarchy of a web page. The start-tag of each identified instance must fully match the regular expression according to the matching rules defined by the java.util.regex package of Java SE 6.
ii) startTagInstanceNumbers: The value of this attribute identifies one or more of the instances of the PropertyListContainer element when multiple instances of this element are identified within the element-hierarchy of a web page via matching the value of the startTag attribute. The value of startTagInstanceNumbers attribute is formed according to one or more of the following formats:
  a) One or more positive integers separated by commas. Each one specifies an instance number.
  b) The character string "lastInstance" separated from others by commas. This refers to the last instance.
  c) One or more character strings of the form "(lastInstance−positiveInteger)" separated by commas from others. lastInstance is a literal string representing the total number of instances of the PropertyListContainer element that have matched the value of the startTag attribute. The target instance number is obtained by subtracting positiveInteger (a positive integer value) from the total number of instances. The result is ignored if it is not a positive integer.
  d) A character string of the form "(positiveIntegerStart to positiveIntegerEnd) to identify the instance numbers in the range from positiveIntegerStart up to and including positiveIntegerEnd, e.g. (2 to 5). This is separated from others by commas. positiveIntegerStart can be a positive integer or a string with format (c) above. positiveIntegerEnd can be a positive integer or a string with format (b) or (c) above. positiveIntegerEnd should identify an instance number which is equal or greater than that identified by positiveIntegerStart.
  e) Also, to include all instances the value of this attribute should be set to −1. The value of this attribute is ignored if it is zero.

For example, if a web page contains multiple forum instances and the properties of each instance are enclosed within a specific type of element (identified by a PropertyListContainer element within the entity CES), then to extract the properties of all forum instances from the page the value of the startTagInstanceNumbers attribute should be set to −1.

The PropertyListContainer element has two optional child-elements. The first one is of type AncestorList element. The contents of this element identify one or more ancestors (parent, parent of parent, all the way to the root of the element-hierarchy of the web page) of the element whose start-tag is specified as the value of the startTag attribute. The second child element is of type ChildList. The contents of this element identify one or more children (child, grandchild, and so on) of the element whose start-tag is specified as the value of the startTag attribute.

1.2.1.1.1.1. AncestorList Element: This element is used to identify one or more ancestor elements (parent, parent of parent, all the way to the root of the element-hierarchy of the web page) of the element whose start-tag is specified as the value of the startTag attribute of the enclosing PropertyListContainer element. Please note that the AncestorList element can be enclosed within elements other than PropertyListContainer to identify their ancestors as well. The AncestorList element has no attributes and may contain one or more instances of the Ancestor element.

1.2.1.1.1.1.1. Ancestor Element: This element is used to identify an ancestor element in the element-hierarchy of the web page. It has two attributes:
i) level: The value of this attribute is a positive integer. It indicates the position of this ancestor in the ancestor-hierarchy, 1 indicates parent, 2 indicates parent of parent, and so on.
ii) startTag: The value of this attribute is a (Java SE 6 compliant) regular expression. It is used to identify an (ancestor) element in the element-hierarchy of the web page. The start-tag of the target ancestor element must fully match the regular expression according to the matching rules defined by the java.util.regex package of Java SE 6.

1.2.1.1.1.2. ChildList Element: This element is used to identify a single branch (i.e. an immediate child, the child of that immediate child, and so on) in the child-hierarchy (i.e. all immediate children, children of immediate children, all the way to the lowest children in the hierarchy) of the element whose start-tag is specified as the value of the startTag attribute of the enclosing PropertyListContainer element. Please note that the ChildList element can be enclosed within elements other than PropertyListContainer to identify their child branches as well. The ChildList element has no attributes and may contain one or more instances of the Child element.

1.2.1.1.1.2.1. Child Element: This element is used to identify a child element in a single branch of the child-hierarchy of the enclosing PropertyListContainer element. It has two attributes:
i) level: The value of this attribute is a positive integer. It indicates the position of this child in a single branch of the child-hierarchy, 1 indicates immediate child, 2 grandchild, and so on.
ii) start Tag: The value of this attribute is either the string "NoChild" or a (Java SE 6 compliant) regular expression. The former indicates that the enclosing PropertyListContainer element has no children. The latter is used to identify a child element in a single branch of the child-hierarchy of the enclosing PropertyListContainer element. The start-tag of the target child element must fully match the regular expression according to the matching rules defined by the java.util.regex package of Java SE 6.

1.2.1.1.2. Property Element: This element performs two roles. The first one is to identify a containing element within the element-hierarchy of a web page. The containing element's contents or attributes' values will be used to derive the value of a property (e.g. date) of the target entity (e.g. forum/thread/post/news-item/etc.). The second role of this element is to fully describe the derivation process. The Property element has the following attributes:
i) name: The value of this attribute identifies a property of the target entity. Examples of value are "Title", "Date", "Author", etc. For example, the value "Date" indicates that the role of the Property element is to identify the element (within the element-hierarchy of a web page) containing the date of the target entity which itself is named by the name attribute of the Entity element enclosing this Property element.
ii) startTag: The value of this attribute is a (Java SE 6 compliant) regular expression. It is used to identify one or more elements in the element-hierarchy of the web page or part thereof. The start-tag of each identified element must fully match the regular expression according to the matching rules defined by the java.util.regex package of Java SE 6. The element-hierarchy that will be examined to find the matching elements has one of two different scopes: a) if a PropertyListContainer element is specified within the enclosing PropertyList element, then the scope is limited to the sub-element-hierarchy rooted at the element identified by the PropertyListContainer element; b) If a PropertyListContainer element is not specified, the scope is the whole of the element-hierarchy of the web page.
iii) start TagInstanceNumbers: The regular expression specified by the startTag attribute may match multiple elements within the element-hierarchy of the web page. The value of the startTagInstanceNumbers attribute identifies one or more of those elements. The value is formed by using one or more of the formats specified earlier in the section describing the startTagInstanceNumbers attribute of the PropertyListContainer element.

PropertyListContainer Element

The Property element contains zero or one instance of the AncestorList and ChildList elements, one instance of the PropertyValuePartList element and zero or one instance of the PropertyValueProcessing element. Each of these element types may act as a container for other element type(s). The details of the element hierarchy rooted at the Property element are described below. The term "containing element" will be used to refer to an element in the element-hierarchy of the web page whose start-tag matches the value of the startTag attribute of the Property element.

1.2.1.1.2.1. AncestorList Element: This is an optional sub-element of the Property element. It identifies the ancestors (parent, parent of parent, all the way to the root of the element-hierarchy of the web page) of the containing element. The AncestorList element acts as a container for one or more instances of the Ancestor element as described earlier in the section covering the PropertyListContainer element.

1.2.1.1.2.2. ChildList Element: This is an optional sub-element of the Property element. It specifies a list of sub-elements of the containing element. Each sub-element in the list is a child of the previous element in the list. The list's root element is a child element of the containing element. The ChildList element acts as a container for one or more instances of the Child element as described earlier in the section covering the PropertyListContainer element.

1.2.1.1.2.3. PropertyValuePartList Element: This is a mandatory sub-element of the Property element. This element is used to generate the value for a property (e.g. date/title/URL/etc.) of an entity. It acts as a container for one or more instances of the PropertyValuePart element (described below). Each PropertyValuePart element generates one part of the property's full value. These part-values are concatenated to generate the property's full value.

1.2.1.1.2.3.1. PropertyValuePart Element: The value of a property may consist of N parts where N is equal or greater than 1. This element describes how one of the N parts of the property's value is generated. The generated value is a character string. It is possible that the whole of a property's value is defined by one instance of this element. This element has one attribute:
i) part Number: The value of this attribute is a positive integer. For a property whose (full) value is composed of N parts, the value of this attribute is in the range 1 to N, indicating which part of the property's value is generated by this instance of the PropertyValuePart element.

The PropertyValuePart element acts as a container for one or more sub-elements of different types. The sub-element types can be divided into three categories. The first category is used to generate values from sources other than the containing element. The sub-elements in this category will be referred to as non-containing-element-value-generator sub-elements. The second category is used to generate values from the containing element's contents and/or its attributes' values. The sub-elements in this category will be referred to as containing-element-value-generator sub-elements. The third category is used to make changes to the value generated by the element types in the other two categories. The sub-elements in this category will be referred to as the value-modifier sub-elements. The element types in each category are now described.

Category 1 element types (non-containing-element-value-generator): There are two element types in this category.

1.2.1.1.2.3.1.1. LiteralValue Element: This element is used to specify a character string value that will be used as the value generated by this element. This element has one attribute:

i) value: The value of this attribute is a character string. It would be used as the value generated by this element 1.2.1.1.2.3.1.2. EntityPropertyValue Element: This element is used to refer to a property of an entity. The entity could be any entity in the entity-hierarchy defined by the enclosing Schema element. The value generated by this element is the value of the named property of the entity. This element has two attributes:

i) entityName: The value of this attribute names the target entity.

ii) propertyName: The value of this attribute names the target property.

Category 2 element types (containing-element-value-generator): There are four element types in this category.

1.2.1.1.2.3.1.3. RegularExpressionGroupList Element: This element is used to extract a character sub-string from one of three sources:

a) The value of an attribute of the containing element
   b) The value of the start-tag of the containing element
   c) The contents of the containing element The extraction is achieved by applying a regular expression (composed according to the rules defined by the java.util.regex package of the Java SE 6) to the source character string and then selecting/removing one or more of the character sub-strings, captured by the regular expression's capturing groups, from the source. This element has three attributes and acts a container for one or more instances of the RegularExpressionGroup element. The three attributes are:

i) source: The value of this attribute is one of three strings, "StartTag", "StartTagAttribute" or "ElementContents" identifying the three sources that the RegularExpressionGroupList element can extract values from.

ii) attributeName: The value of this attribute names an attribute in the start-tag of the containing element if the source attribute has the value "StartTagAttribute", otherwise its value should be set to the empty string " ".

iii) regularExpression: The value of this attribute is a (Java SE 6 compliant) regular expression. The value can also be the string "StartTagRegularExpression" to indicate that the required regular expression is that defined as the value of the startTag attribute of the enclosing Property element. In either case, the regular expression is applied to the value of the source named by the value of the source attribute.

1.2.1.1.2.3.1.3.1. RegularExpressionGroup Element: This element is used to generate a character string value from the source named by the source attribute of the enclosing RegularExpressionGroupList element. It has two attributes:

i) groupNumber: The value of this attribute is zero or a positive integer. It identifies a capturing group in the regular expression specified by regularExpression attribute of the enclosing RegularExpressionGroupList element.

ii) action: The value of this attribute is one of the two strings "Select" or "Remove". "Select" indicates that the character sub-string captured from the source character string by the capturing group, named by the groupNumber attribute, should be selected as the value generated by this RegularExpressionGroup element. "Remove" indicates that the captured character sub-string should be removed from the source character string and the remainder is used as the value generated by this RegularExpressionGroup element.

When multiple instances of the RegularExpressionGroup element are specified within the same RegularExpressionGroupList element, the values generated by them are concatenated to form the value generated by the RegularExpressionGroupList element.

1.2.1.1.2.3.1.4. RelevantSubElement Element: This element is used to identify one or more sub-elements of the containing element. The (target) sub-elements have identical start-tags. The contents of these sub-elements or their start-tags will be concatenated (in the order in which they are specified within the containing element) to form the value generated by this element. This element has the following attributes:

i) subElemStartTag: The value of this attribute is a (Java SE 6 compliant) regular expression. It is used to identify one or more sub-elements of the containing element. The start-tag of each target sub-element must fully match the regular expression according to the matching rules defined by the java.util.regex package of Java SE 6.

ii) subElemType: The value of this attribute is one of the two strings "Child" or "SubElement". "Child" indicates that only the child sub-elements, i.e. those immediately below the containing element (in the element-hierarchy of the web page) should be searched to find the target sub-elements. "SubElement" indicates that all sub-elements should be searched to find the target ones.

iii) subElemInstanceNumbers: The value of this attribute identifies one or more of the sub-elements whose start-tags have fully matched the value of the subElemStartTag attribute and are of the type specified by the subElemType attribute. The value of this attribute has identical format to that of the startTagInstanceNumbers attribute of the PropertyListContainer element described earlier.

iv) subElemDataType: The value of this attribute is one of the two strings "SubElementsContents" or "SubElementsStartTags". "SubElementsContents" indicates that the contents of the target sub-elements should be concatenated to generate the value of this element. "SubElementsStartTags" indicates that the start-tags of the target sub-elements should be concatenated to generate the element's value.

1.2.1.1.2.3.1.5. IrrelevantSubElement Element: This element is used to identify one or more sub-elements of the containing element. The (target) sub-elements have identical start-tags. The contents of these sub-elements or their start-tags should be removed from the contents of the containing element. The remainder of the containing element's contents will be the value generated by this element. This element has the same four attributes as the RelevantSubElement element. The values and purposes of the first three are the same in both elements. The fourth attribute, however, has a different purpose in the context of the IrrelevantSubElement element:

iv) subElemDataType: The value of this attribute is one of the two strings "SubElementsContents" or "SubElementsStartTags". "SubElementsContents" indicates that the contents of the target sub-elements should be removed from the contents of the containing element. "SubElementsStartTags" indicates that the start-tags of the target sub-elements should be removed from the contents of the containing element. In both cases, the remainder of the contents of the containing element will be the value generated by the IrrelevantSubElement element. Category 3 element types (value-modifier): One or more instances of a category 3 element type may appear in a PropertyValuePart element after an instance of the category 1 or 2 element type. The category 1 or 2 instance provides the input value (a character string) for the first of the category 3 instances. This first instance modifies its input value and passes the result to the next instance of category 3, which will act in the same fashion, until the final instance generates its output. The output of the final instance will be the value generated by the PropertyValuePart element. There are six element types in category 3.

1.2.1.1.2.3.1.6. ReplacementStringList Element: This element is used to replace instances of one or more individual sub-strings of its input with other strings. This element has no attributes and acts as a container for one or more instances of the ReplacementString element. The input to each ReplacementStringList instance is the same as the input to the enclosing ReplacementStringList element. In other words, the ReplacementString instances simultaneously process the input to the enclosing ReplacementStringList element.

1.2.1.1.2.3.1.6.1. ReplacementString Element: This element is used to replace one or more instances of a sub-string of the input to the enclosing ReplacementStringList element with another sub-string. It has three attributes:
i) currentString: The value of this attribute is the sub-string that is to be replaced.
ii) currentStringInstanceNumbers: The value of this attribute identifies the instances of the sub-string specified by the current String attribute that should be replaced. The value of this attribute has identical format to that of the start TagInstanceNumbers attribute of the PropertyListContainer element described earlier.
iii) replacementString: The value of this attribute is the replacement string for all instances specified by the currentStringInstanceNumbers attribute.

1.2.1.1.2.3.1.7. RemoveIndexRangeList Element: This element is used to remove one or more individual sub-strings of its input. Each sub-string is identified via its start and end index positions within the input string. This element has no attributes and acts as a container for one or more instances of the RemoveIndexRange element. The input to each RemoveIndexRange instance is the same as the input to the enclosing RemoveIndexRangeList element. In other words, the RemoveIndexRange instances simultaneously process the input to the enclosing RemoveIndexRangeList element.

1.2.1.1.2.3.1.7.1. RemoveIndexRange Element: This element is used to remove a character sub-string from the input to the enclosing RemoveIndexRangeList element. It has two attributes:
i) startIndex: The value of this attribute is a non-negative integer specifying the start index position of the sub-string that should be removed.
ii) endIndex: The value of this attribute is a non-negative integer specifying the end index position of the sub-string that should be removed.

1.2.1.1.2.3.1.8. InsertStringList Element: This element is used to insert one or more strings at specific index positions of its input. This element has no attributes and acts as a container for one or more instances of the InsertString element. The input to each InsertString instance is the same as the input to the enclosing InsertStringList element. In other words, the InsertString instances simultaneously process the input to the enclosing InsertStringList element.

1.2.1.1.2.3.1.8.1. InsertString Element: This element is used to specify a character string and an index position. The character string will be inserted at the specified index position of the input character string passed to this element. It has two attributes:
i) string: The value of this attribute is the string that should be inserted.
ii) insertIndex: The value of this attribute is zero or a positive integer specifying the index position at which the string should be inserted.

1.2.1.1.2.4. PropertyValueProcessing Element: This is the third (and last) sub-element of the Property element. It is an optional sub-element. This element provides instructions on how the value generated by the PropertyValuePartList sub-element (of the Property element) should be further processed through invoking one or more methods. This element has no attributes and acts as a container for one or more instances of the ProcessingMethod element. The input to the first ProcessingMethod instance is the same as the input to the enclosing PropertyValueProcessing element. The input to each subsequent instance is the output of the preceding instance. The output of the final instance will be used as the value generated by the enclosing PropertyValueProcessing element.

1.2.1.1.2.4.1. ProcessingMethod Element: This element is used to identify a method that should be invoked to process the input to the enclosing PropertyValueProcessing element. It acts as a container for zero or more instances of the MethodParameter element. It has one attribute:
i) methodUri: The value of this attribute identifies the method that should be invoked. It could identify a local method or a remote one, for example, hosted by a Web service on the Internet.

1.2.1.1.2.4.1.1. MethodParameter Element: This element is used to specify a single input parameter for the method identified by the enclosing ProcessingMethod element. It has two parameters:
i) position: The value of this attribute is a positive integer. It specifies the position of this parameter in the list of input parameters of the method identified by the enclosing ProcessingMethod element.
ii) value: This attribute specifies the value of the input parameter. This value could be set to "PropertyValuePartList" in which case the value generated by the PropertyValuePartList element in the enclosing Property element will be used as the value of this parameter.

APPENDIX B: EXAMPLE OF A CONTENTS EXTRACTION SCHEMA

The following code is abbreviated to meet USPTO printing limitations but the entire code is available in USPTO file wrapper:

```
<Schema name="SomeCo" version="1.0">
  <EntityRelationList>
    <EntityRelation parentEntityName="Forum"
```

```xml
                    childEntityName="Thread"
                    parentEntityPropertyLocatingChildEntity="URL"
                    locatingPropertyFilter=".*" /> <!-- Filter allows all -->
        <EntityRelation parentEntityName="Thread"
                    childEntityName="Post"
                    parentEntityPropertyLocatingChildEntity="URL"
                    locatingPropertyFilter=".*" /> <!-- Filter allows all -->
    </EntityRelationList>
    <EntityList>
        <Entity name="Forum" acceptanceThreshold="60%"
                    firstProperty="Name,ForumID,URL"
                    lastProperty="NumberOfPosts">
            <PropertyList scope="IndividualProperties">
                <Property name="Name"
                    startTag="<a href="http://www.someco.com/forum/ ([^/]*)/">"
                    startTagInstanceNumbers="-1">
                    <AncestorList>
                        <Ancestor level="1" startTag="<div>" />
                    </AncestorList>
                    <PropertyValuePartList>
                        <PropertyValuePart partNumber="1">
                            <ElementContentsAll />
                        </PropertyValuePart>
                    </PropertyValuePartList>
                </Property>
                <Property name="ForumID"
                    startTag="<a href="http://www.someco.com/forum/ ([^/]*)/">"
                    startTagInstanceNumbers="-1">
                    <AncestorList>
                        <Ancestor level="1" startTag="<div>"/>
                    </AncestorList>
                    <PropertyValuePartList>
                        <PropertyValuePart partNumber="1">
                            <RegularExpressionGroupList source="StartTag" attributeName=""
                                regularExpression="StartTagRegularExpression">
                                <RegularExpressionGroup groupNumber="1"
                                    action="Select" />
                            </RegularExpressionGroupList>
                        </PropertyValuePart>
                    </PropertyValuePartList>
                </Property>
                <Property name="URL"
                    startTag="<a href="http://www.someco.com/forum/([^/]*)/">"
                    startTagInstanceNumbers="-1">
                    <AncestorList>
                        <Ancestor level="1" startTag="<div>"/>
                    </AncestorList>
                    <PropertyValuePartList>
                        <PropertyValuePart partNumber="1">
                            <StartTagAttributeValue
                                attributeName="href" />
                        </PropertyValuePart>
                    </PropertyValuePartList>
                </Property>
                <Property name="LastPostedDate"
                    startTag="<div align="right" style="white-space:nowrap">"
                    startTagInstanceNumbers="-1">
                    <PropertyValuePartList>
                        <PropertyValuePart partNumber="1">
                            <ElementContentsAll />
                        </PropertyValuePart>
                    </PropertyValuePartList>
                    <PropertyValueProcessing>
                        <ProcessingMethod methodUri="http://localhost/convertDate">
                            <MethodParameter position="1" value="PropertyvaluePartList">
                            <MethodParameter position="2" value="dd-MM-yy hh:mm a"> <!-- Example: 23-10-10 12:25 PM -->
                        </ProcessingMethod>
                    </PropertyValueProcessing>
                </Property>
                <Property name="NumberOfThreads"
                    startTag="<td class="alt1">"
                    startTagInstanceNumbers="-1">
                    <PropertyValuePartList>
                        <PropertyValuePart partNumber="1">
                            <ElementContentsAll />
                            <ReplacementStringList>
                                <ReplacementString currentString="-"
                                    currentStringInstanceNumbers="-1" replacementString="0" />
                                <ReplacementString currentString=","
                                    currentStringInstanceNumbers="-1" replacementString="" />
                            </ReplacementStringList>
                        </PropertyValuePart>
                    </PropertyValuePartList>
                </Property>
                <Property name="NumberOfPosts"
                    startTag="<td class="alt2">"
                    startTagInstanceNumbers="-1">
                    <ChildList>
                        <Child level="" startTag="NoChild" />
                    </ChildList>
                    <PropertyValuePartList>
                        <PropertyValuePart partNumber="1">
                            <ElementContentsAll />
                            <ReplacementStringList>
                                <ReplacementString currentString="-"
                                    currentStringInstanceNumbers="-1" replacementString="0" />
                                <ReplacementString currentString=","
                                    currentStringInstanceNumbers="-1" replacementString="" />
                            </ReplacementStringList>
                        </PropertyValuePart>
                    </PropertyValuePartList>
                </Property>
            </PropertyList>
        </Entity>
        <Entity name="Thread" acceptanceThreshold="60%"
                    firstProperty="Title,ThreadID,URL"
                    lastProperty="NumberOfReplies">
            <PropertyList scope="IndividualProperties">
                <Property name="Title"
                    startTag="<a href="http://www.someco.com/forum/(.*)/([0-9]*)-(.*).html" id="thread_title_([0-9]*)"(.*)>"
                    startTagInstanceNumbers="-1">
                    <PropertyValuePartList>
                        <PropertyValuePart partNumber="1">
                            <ElementContentsAll />
                        </PropertyValuePart>
                    </PropertyValuePartList>
                </Property>
                <Property name="ThreadID"
                    startTag="<a href="http://www.someco.com/forum/(.*)/([0-9]*)-(.*).html" id="thread_title_([0-9]*)"(.*)>"
                    startTagInstanceNumbers="-1">
                    <PropertyValuePartList>
                        <PropertyValuePart partNumber="1">
                            <RegularExpressionGroupList source="StartTag"
                                attributeName="" regularExpression="StartTagRegularExpression">
                                <RegularExpressionGroup groupNumber="2"
                                    action="Select" />
                            </RegularExpressionGroupList>
                        </PropertyValuePart>
                    </PropertyValuePartList>
                </Property>
                <Property name="URL"
                    startTag="<a href="http://www.someco.com/forum/(.*)/([0-9]+)-(.*).html" (> | id="thread_title_(.*)>)"
                    startTagInstanceNumbers="-1">
                    <PropertyValuePartList>
                        <PropertyValuePart partNumber="1">
                            <StartTagAttributeValue
                                attributeName="href" />
                        </PropertyValuePart>
                    </PropertyValuePartList>
                </Property>
                <Property name="LastPostedDate"
                    startTag="<div class="smallfont" style="text-align:right; white-space:nowrap">"
```

```
                    startTagInstanceNumbers="-1">
            <PropertyValuePartList>
                <PropertyValuePart partNumber="1">
                    <RegularExpressionGroupList
source="ElementContents" attributeName=""
regularExpression="(.*) by (.*)">
                        <RegularExpressionGroup groupNumber="1"
action="Select" />
                    </RegularExpressionGroupList>
                </PropertyValuePart>
            </PropertyValuePartList>
            <PropertyValueProcessing>
                <ProcessingMethod
methodUri="http://localhost/convertDate">
                    <MethodParameter position="1"
value="PropertyValuePartList">
                    <MethodParameter position="2"
value="dd-MM-yyhh:mm a"> <!-- Example: 23-10-10 12:25 PM -->
                </ProcessingMethod>
            </PropertyValueProcessing>
        </Property>
        <Property name="NumberOfReplies"
                    startTag="<td class="alt1"
                    align="center">"
                    startTagInstanceNumbers="-1">
            <PropertyValuePartList>
                <PropertyValuePart partNumber="1">
                    <ElementContentsAll />
                    <ReplacementStringList>
                        <ReplacementString currentString="-"
currentStringInstanceNumbers="-1" replacementString="0" />
                        <ReplacementString currentString=","
currentStringInstanceNumbers"-1" replacementString="" />
                    </ReplacementStringList>
                </PropertyValuePart>
            </PropertyValuePartList>
        </Property>
    </PropertyList>
</Entity>
<Entity name="Post" acceptanceThreshold="60%"
firstProperty="Date" lastProperty="Contents">
    <PropertyList scope="IndividualProperties">
        <Property name="Date"
                    startTag="<div align="left"
style="white-space:nowrap">"
                    startTagInstanceNumbers="-1">
            <AncestorList>
                <Ancestor level="1"
startTag="<td class="thead" style="font-weight:normal; border:
2px solid #D1D1E1; border-right: 1px" >" />
            </AncestorList>
            <PropertyValuePartList>
                <PropertyValuePart partNumber="1">
                    <ElementContentsAll />
                </PropertyValuePart>
            </PropertyValuePartList>
            <PropertyValueProcessing>
                <ProcessingMethod
methodUri="http://localhost/convertDate">
                    <MethodParameter position="1"
value="PropertyValuePartList">
                    <MethodParameter position="2"
value="dd-MM-yy hh:mm a"> <!-- Example: 23-10-10 12:25 PM -->
                </ProcessingMethod>
            </PropertyValueProcessing>
        </Property>
        <Property name="PostID"
                    startTag="<a name="post([0-9]+)">"
                    startTagInstanceNumbers="-1">
            <PropertyValuePartList>
                <PropertyValuePart partNumber="1">
                    <RegularExpressionGroupList
source="StartTag" attributeName=""
regularExpression="StartTagRegularExpression">
                        <RegularExpressionGroup
groupNumber="1" action="Select" />
                    </RegularExpressionGroupList>
                </PropertyValuePart>
            </PropertyValuePartList>
        </Property>
        <Property name="ThreadID"
                    startTag="<a
href="http://www.someco.com/forums/forum_([0-9]+)/
thread_([0-9]+).html#post([0-9]+)" title="Link to this Post">"
                    startTagInstanceNumbers="-1">
            <PropertyValuePartList>
                <PropertyValuePart partNumber="1">
                    <RegularExpressionGroupList source="StartTag"
attributeName=" regularExpression="StartTagRegularExpression">
                        <RegularExpressionGroup
groupNumber="2" action="Select" />
                    </RegularExpressionGroupList>
                </PropertyValuePart>
            </PropertyValuePartList>
        </Property>
        <Property name="URL"
                    startTag="<a
href="http://www.someco.com/forums/forum_([0-9]+)/thread_([0-
9]+).html#post([0-9]+)" title="Link to this Post">"
                    startTagInstanceNumbers="-1">
            <PropertyValuePartList>
                <PropertyValuePart partNumber="1">
                    <StartTagAttributeValue attributeName="href" />
                </PropertyValuePart>
            </PropertyValuePartList>
        </Property>
        <Property name="Title"
                    startTag="<div class="smallfont">"
                    startTagInstanceNumbers="-1">
            <PropertyValuePartList>
                <PropertyValuePart partNumber="1">
                    <EntityPropertyValue entityName="Thread"
propertyName="Title" />
                </PropertyValuePart>
            </PropertyValuePartList>
        </Property>
        <Property name="Author"
                    startTag="<a rel="nofollow"
class="bigusername" href="http://www.someco.com/members/
(.*)\.html">"
                    startTagInstanceNumbers="-1">
            <PropertyValuePartList>
                <PropertyValuePart partNumber="1">
                    <ElementContentsAll />
                </PropertyValuePart>
            </PropertyValuePartList>
        </Property>
        <Property name="AuthorURL"
                    startTag="<a rel="nofollow"
class="bigusername" href="http://www.someco.com/members/
(.*)\.html">"
                    startTagInstanceNumbers="-1" >
            <PropertyValuePartList>
                <PropertyValuePart partNumber="1">
                    <StartTagAttributeValue
                    attributeName="href" />
                </PropertyValuePart>
            </PropertyValuePartList>
        </Property>
        <Property name="Contents"
                    startTag="<div id="post_message_([0-9]+)">"
                    startTagInstanceNumbers="-1">
            <PropertyValuePartList>
                <PropertyValuePart partNumber="1">
                    <IrrelevantSubElement subElemStartTag=
"<divstyle="margin:20px; margin-top:5px; ">" subElemType="Child"
subElemInstanceNumbers="-1"
subElemDataType="SubElementsContents" />
```

What is claimed is:

1. A method of automatically extracting content from a data resource, the data resource comprising a plurality of hierarchical levels, each of the plurality of hierarchical levels comprising content defined using mark-up language and the method comprising a training phase and a content extraction phase, wherein the entirety of the training phase precedes the content extraction phase so that the content extraction phase can only begin when the entirety of the training phase has been completed;
the training phase comprising the steps of:
i) defining one or more hierarchical levels of interest;
ii) defining an entity which is comprised within the one or more hierarchical levels of interest defined in step i) and one or more properties associated with that entity;
and for said entity and the associated entity properties defined in step ii), executing a plurality of training instances, wherein each of the training instances comprises the steps of:
a) defining a value for each of the one or more properties associated with said entity;
b) for each of the property values, determining a containing element which provides a match to the property value and storing the containing element in an instance schema, the instance schema being associated with said entity; and
iii) comparing each of a plurality of instance schemas associated with said entity to generate a final schema for said entity; and
iv) storing the one or more final schemas in a composite schema which is associated with the data resource;
the content extraction phase comprising the steps of:
I) comparing a data resource from which content is to be extracted with the composite schema;
II) identifying entities and their associated properties within the data resource which match the containing elements specified in the composite schema; and
III) extracting those entities and their associated properties identified in step II) from the data resource;
wherein the completion of the entirety of the training phase results in the generation of the composite schema, and the content extraction phase cannot begin without that generated composite schema.

2. A method according to claim 1 wherein in step iii) the first instance schema to be generated for an entity is retained and is assigned an occurrence count value of 1.

3. A method according to claim 1 wherein in step iii) if there is no adequate match between a first instance schema and a second instance schema then the second instance schema will be retained and is assigned an occurrence count value of 1.

4. A method according to claim 1 wherein in step iii) if a first instance schema is identical to a second instance schema then the occurrence count of the first instance schema will be incremented and the second instance schema will be discarded.

5. A method according to claim 1, wherein in step iii), a derived instance schema is created by merging a first instance schema with a second instance schema.

6. A method according to claim 5, wherein a derived instance schema is created by merging a first instance schema with a second instance schema if there is an adequate degree of similarity between the first and second schemas.

7. A method according to claim 6 wherein a derived instance schema is created by merging a first instance schema with a second instance schema if the first and second instance schema comprise:
a) a common start-tag;
b) identical sub-element hierarchies; and
c) an equal number of property elements comprised within the sub-element hierarchies.

8. A method according to claim 7, wherein the predetermined threshold value is 60%.

9. A method according to claim 5, wherein the first derived instance schema to be generated for an entity is retained and is assigned an occurrence count value of 1.

10. A method according to claim 5, wherein if a first derived instance schema is identical to a second derived instance schema then the occurrence count of the first derived instance schema will be incremented and the second derived instance schema will be discarded.

11. A method according to claim 1, wherein step iii) comprises the step of determining which of the plurality of instance schemas and derived instance schemas has an occurrence frequency which exceeds a predetermined threshold value.

12. A method according to claim 1 in which three or more training instances are executed for each of the entities.

13. A non-transitory data carrier for use in a computing device, the data carrier comprising computer executable code which, in use, performs a method of automatically extracting content from a data resource, the data resource comprising a plurality of hierarchical levels, each of the plurality of hierarchical levels comprising content defined using mark-up language and the method comprising a training phase and a content extraction phase, wherein the entirety of the training phase precedes the content extraction phase so that the content extraction phase can only begin when the entirety of the training phase has been completed;
the training phase comprising the steps of:
i) defining one or more hierarchical levels of interest;
ii) defining an entity which is comprised within the one or more hierarchical levels of interest defined in step i) and one or more properties associated with that entity;
and for said entity and the associated entity properties defined in step ii), executing a plurality of training instances, wherein each of the training instances comprises the steps of:
a) defining a value for each of the one or more properties associated with said entity;
b) for each of the property values, determining a containing element which provides a match to the property value and storing the containing element in an instance schema, the instance schema being associated with said entity; and
iii) comparing each of a plurality of instance schemas associated with said entity to generate a final schema for said entity; and
iv) storing the one or more final schemas in a composite schema which is associated with the data resource;
the content extraction phase comprising the steps of:
I) comparing a data resource from which content is to be extracted with the composite schema;
II) identifying entities and their associated properties within the data resource which match the containing elements specified in the composite schema; and
III) extracting those entities and their associated properties identified in step II) from the data resource;
wherein the completion of the entirety of the training phase results in the generation of the composite schema, and the content extraction phase cannot begin without that generated composite schema.

14. An apparatus comprising one or more central processing units, one or more data storage means and a network interface, the apparatus, in use, being configured to perform automatically extracting content from a data resource, the data resource comprising a plurality of hierarchical levels, each of the plurality of hierarchical levels comprising content defined using mark-up language and the extracting comprising a training phase and a content extraction phase, wherein the entirety of the training phase precedes the content extraction phase so that the content extraction phase can only begin when the entirety of the training phase has been completed;

the training phase comprising the steps of:
i) defining one or more hierarchical levels of interest;
ii) defining an entity which is comprised within the one or more hierarchical levels of interest defined in step i) and one or more properties associated with that entity;

and for said entity and the associated entity properties defined in step ii), executing a plurality of training instances, wherein each of the training instances comprises the steps of:
a) defining a value for each of the one or more properties associated with said entity;
b) for each of the property values, determining a containing element which provides a match to the property value and storing the containing element in an instance schema, the instance schema being associated with said entity; and
iii) comparing each of a plurality of instance schemas associated with said entity to generate a final schema for said entity; and
iv) storing the one or more final schemas in a composite schema which is associated with the data resource;

the content extraction phase comprising the steps of:
I) comparing a data resource from which content is to be extracted with the composite schema;
II) identifying entities and their associated properties within the data resource which match the containing elements specified in the composite schema; and
III) extracting those entities and their associated properties identified in step II) from the data resource;

wherein the completion of the entirety of the training phase results in the generation of the composite schema, and the content extraction phase cannot begin without that generated composite schema.

* * * * *